United States Patent
Frankel et al.

(10) Patent No.: US 11,835,753 B2
(45) Date of Patent: Dec. 5, 2023

(54) HOLLOW CORE FIBER FOR SECURE OPTICAL COMMUNICATION

(71) Applicant: CIENA CORPORATION, Hanover, MD (US)

(72) Inventors: Michael Y. Frankel, Bethesda, MD (US); John Israel, Purcellville, VA (US); James Westdorp, Perry Hall, MD (US)

(73) Assignee: Ciena Corporation, Hanover, MD (US)

( * ) Notice: Subject to any disclaimer, the term of this patent is extended or adjusted under 35 U.S.C. 154(b) by 179 days.

(21) Appl. No.: 17/509,114

(22) Filed: Oct. 25, 2021

(65) Prior Publication Data

US 2023/0131148 A1   Apr. 27, 2023

(51) Int. Cl.
| | |
|---|---|
| *H04B 10/08* | (2006.01) |
| *G02B 6/02* | (2006.01) |
| *G02B 6/032* | (2006.01) |
| *H04L 9/40* | (2022.01) |
| *G08B 13/186* | (2006.01) |
| *H04B 10/071* | (2013.01) |

(52) U.S. Cl.
CPC ..... *G02B 6/02304* (2013.01); *G02B 6/02328* (2013.01); *G02B 6/032* (2013.01); *G08B 13/186* (2013.01); *H04B 10/071* (2013.01); *H04L 63/162* (2013.01)

(58) Field of Classification Search
CPC .. H04B 10/071; H04B 10/0795; H04B 10/40; H04B 10/2507; H04B 10/07955; H04B 10/07953; H04B 10/2581; H04J 14/04; H04J 14/02; G02B 6/02304; G02B 6/02328; G02B 6/032

USPC ........ 398/16, 10, 13, 20, 21, 44, 33, 38, 25, 398/26, 27, 28, 158, 159, 79, 135, 136
See application file for complete search history.

(56) References Cited

U.S. PATENT DOCUMENTS

| | | | |
|---|---|---|---|
| 8,798,455 B2 | 8/2014 | Frankel | |
| 10,784,969 B2 * | 9/2020 | Weiner | H04B 10/85 |
| 11,212,005 B1 * | 12/2021 | Jopson | H04J 14/02 |

(Continued)

OTHER PUBLICATIONS

Charu Goel and Seongwoo Yoo, "Multimode Nested Antiresonant Hollow Core Fiber," J. Lightwave Technol. 39, 5592-6598 (Oct. 2021).

(Continued)

*Primary Examiner* — Hanh Phan
(74) *Attorney, Agent, or Firm* — Baratta Law PLLC; Lawrence A. Baratta, Jr.

(57) ABSTRACT

A hollow core fiber (HCF) link is characterized by structural properties selected to support and sustain light propagation in a fundamental mode and in at least one higher-order mode. Connected to a proximal end of the HCF link, there is a mode coupler configured to couple a data signal into the fundamental mode and to couple an obfuscating signal into the at least one higher-order mode for simultaneous propagation of the data signal and the obfuscating signal on the HCF link, where the obfuscating signal substantially overlaps the data signal in spectral content. At a distal end of the HCF link, there is a mode splitter configured to split a first optical signal detected in the fundamental mode from a second optical signal detected in the at least one higher-order mode.

20 Claims, 9 Drawing Sheets

(56) References Cited

U.S. PATENT DOCUMENTS

| | | | | |
|---|---|---|---|---|
| 2011/0268436 A1* | 11/2011 | Frankel | ............... | H04B 10/85 398/9 |
| 2020/0378864 A1* | 12/2020 | O'Sullivan | ........ | G02B 6/02328 |
| 2021/0396927 A1* | 12/2021 | Harker | ............... | G01M 11/33 |

OTHER PUBLICATIONS

Bradley., et al., "Modal Content in Hypocycloid Kagome Hollow Core Photonic Crystal Fibers", Optical Society of America, vol. 24, Issue 14, Jul. 11, 2016, pp. 15798-15812.

Bradley., et al., "Record Low-Loss 1.3dB/km Data Transmitting Antiresonant Hollow Core Fibre", 2018 European Conference on Optical Communication, 2018, pp. 1-3.

Buczynski R., "Photonic Crystal Fibers", Proceedings of the XXXIII International School of Semiconducting Compounds, Jaszowiec, vol. 106, No. 2,2004, 27 pages.

Buet X., et al., "Nondestructive Measurement of the Roughness of the Inner Surface of Hollow Core-Photonic Bandgap Zibers", Optics Letters, vol. 41, Issue 21, Jan. 11, 2016, 5 pages.

Chen Y., et al., "Demonstration of a Wide Bandwidth, Low Loss Hollow Core Photonic Bandgap Fiber in the 1.55 um Wavelength Region", 5th Workshop on Specialty Optical Fiber and Their Applications, Oct. 11, 2017, 2 pages.

Foroni et al., "Guiding Properties of Silica/Air Hollow-Core Bragg Fibers," Journal of Lightwave Technology, vol. 26, No. 13, Jul. 1, 2008.

Gruner-Nielsen et al., "Mode Division Multiplexing on Standard 50/125 um Multi Mode Fiber using Photonic Lanterns," OFC 2021.

Habib et al., "Impact of cladding elements on the loss performance of hollow-core anti-resonant fibers," Optics Express, vol. 29, No. 3, Feb. 1, 2021.

Hayes., et al., "Antiresonant Hollow Core Fiber with Octave Spanning Bandwidth for Short Haul Data Communications", Journal of Lightwave Technology, pp. 1-5, DOI: 10.5258/SOTON/397853, 2016.

Jasion et al., "Hollow Core NANF with 0.28 dB/km Attenuation in the C and L Bands," OFC 2020.

Jimenez Gordillo et al., "Bridging Between Si and Few-Mode Fiber Higher Order Modes," CLEO 2020.

Kim H., et al., "Free Space based Hollow Core Fiber Interconnection and Associated In-Line Components", Optical Fiber Communications Conference and Exhibition 2019, 3 pages.

Kuschnerov M., et al., "Data Transmission through up to 74.8 km of Hollow-Core Fiber with Coherent and Direct-Detect Transceivers", European Conference on Optical Communication 2015, Sep. 27, 2015, ID: 0049, 3 pages.

Kuschnerov M., et al., "Transmission of Commercial Low Latency Interfaces Over Hollow-Core Fiber", Journal ofJghtwave Technology, Jan. 15, 2016, vol. 34, Issue. 2, pp. 314-320.

Labroille et al., "Mode Selective 10-Mode Multiplexer based on Multi-Plane Light Conversion," OFC 2016.

Mangan B J., et al., "Low Loss (1.7 dB/km) Hollow Core Photonic Bandgap Fiber", Optical Fiber Communications Conference, 2004, Feb. 22, 2004, 3 pages.

Mousavi S A., et al., "Broadband High Birefringence and Polarizing Hollow Core Antiresonant Fibers", Optics Express, Mar. 10, 2016, vol. 24, No. 20, pp. 22943-22958.

Nawazuddin M., et al., "Lotus Shaped Negative Curvature Hollow Core Fiber with 10.5 dB/km at 1550 nm Wavelength", Journal of Lightwave Technology, Mar. 1, 2018, vol. 36, No. 5, pp. 1213-1219.

Ravaille A., et al., "In-situ measurement of backscattering in hollow-core fiber based resonant cavities", IEEE Photonics Journal, Aug. 2017, vol. 9, No. 4, 6 pages.

Richardson D J., et a., "New optical fibres for high-capacity optical communications", Philosophical Transactions of the Royal Society, Mar. 6, 2016, vol. 374, No. 2062, pp. 1-18.

Skorobagatiy et al. "Directional coupling in hollow Bragg fiber bundles," OFC 2005.

Slavik R., et al., "Ultralow Thermal Sensitivity of Phase and Propagation Delay in Hollow-Core Fibres", European Conference on Optical Communications, Sep. 17, 2017, 3 pages.

Wheeler N V., et al., "Low Loss Kagome Hollow Core Fibers Operating from the Near- to the Mid-IR", Optics Letters, vol. 42, Issue 13, Jul. 1, 2017, 6 pages.

\* cited by examiner

601 →

602 →

HOLLOW CORE FIBER FOR SECURE OPTICAL COMMUNICATION

TECHNICAL FIELD

This document relates to the technical field of optical communications.

BACKGROUND

An optical communication system or network may comprise one or more links, where a given link connects a transmitter to a receiver by one or more optical fibers. Each link may comprise one or more spans, where a given span comprises a length of fiber and one or more optical amplifiers used to compensate for the attenuation loss in that span.

Conventional optical fibers generally have a solid core made of glass or plastic.

SUMMARY

In a broad aspect, an optical communication system comprises a hollow core fiber (HCF) link supporting light propagation in a fundamental mode and in at least one higher-order mode, where the HCF link is characterized by structural properties selected to sustain the light propagation on both the fundamental mode and the at least one higher-order mode. The system further comprises a propagation mode coupler connected to a proximal end of the HCF link, where the propagation mode coupler is configured to couple a data signal into the fundamental mode and to couple an obfuscating signal into the at least one higher-order mode for simultaneous propagation of the data signal and the obfuscating signal on the HCF link, and where the obfuscating signal substantially overlaps the data signal in spectral content. The system further comprises a propagation mode splitter connected to a distal end of the HCF link, where the propagation mode splitter is configured to split a first optical signal detected in the fundamental mode from a second optical signal detected in the at least one higher-order mode.

According to some examples, the obfuscating signal comprises a noise signal.

According to some examples, the HCF link comprises hollow core anti-resonant fiber (HC-ARF).

According to some examples, the HC-ARF comprises nested anti-resonant nodeless fiber (NANF).

According to some examples, the system further comprises an optical receiver device configured to recover the data signal from the first optical signal.

According to some examples, the optical receiver device is further configured to detect a power loss in the first optical signal, and to generate an intrusion warning responsive to determining that the power loss is indicative of an intrusion in the HCF link.

According to some examples, the system further comprises a loss detector device configured to detect a power loss in the second optical signal, and to generate an intrusion warning responsive to determining that the power loss is indicative of an intrusion in the HCF link.

According to some examples, the at least one higher-order mode substantially physically surrounds the fundamental mode.

In another broad aspect, a method comprises generating a probe signal at an optical time-domain reflectometry (OTDR) device, the probe signal comprising a series of optical probe pulses. The method further comprises coupling the probe signal into at least one of one or more propagation modes supported by a hollow core fiber (HCF) link using a propagation mode coupler connected to a proximal end of the HCF link, and propagating the probe signal from the proximal end of the HCF link towards a distal end of the HCF link. The method further comprises detecting at the OTDR device a reflections signal comprising reflections of the optical probe pulses, the reflections originating from the HCF link, and generating at the OTDR device an intrusion warning responsive to determining that the reflections signal is indicative of an intrusion in the HCF link.

According to some examples, the HCF link supports light propagation in a fundamental mode and at least one higher-order mode, and the HCF link is characterized by structural properties selected to sustain the light propagation on the at least one higher-order mode, and the propagation mode coupler is configured to couple the probe signal into the at least one higher-order mode.

According to some examples, the optical probe pulses are each of duration 1 ns or lower, and the intrusion warning indicates a position of the intrusion with a resolution of 30 cm or lower.

According to some examples, the optical probe pulses are each of duration 10 ps or lower, and the intrusion warning indicates a position of the intrusion with a resolution of 0.3 cm or lower.

DETAILED DESCRIPTION

Figure 1:
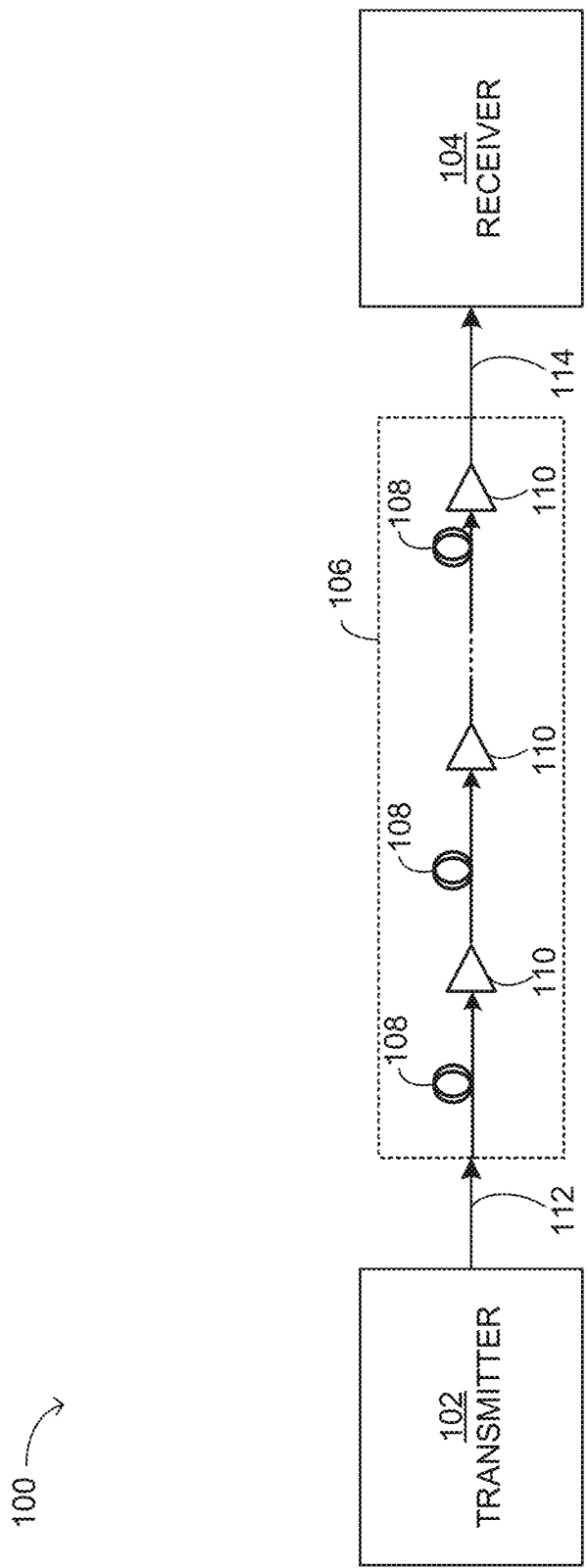
FIG. 1 illustrates an example optical communication system.

FIG. 1 illustrates an optical communication system 100, in accordance with some examples of the technology disclosed herein.

The communication system 100 may comprise at least one optical transmitter device, such as the transmitter 102, and at least one optical receiver device, such as the receiver 104. The transmitter 102 is capable of transmitting optical signals, and the receiver 104 is capable of receiving optical signals. According to some examples, the transmitter 102 is also capable of receiving optical signals. According to some examples, the receiver 104 is also capable of transmitting optical signals. Thus, one or both of the transmitter 102 and the receiver 104 may be capable of acting as an optical transceiver. According to some examples, one or both of the transmitter 102 and the receiver 104 may be a coherent optical modem.

The transmitter 102 and the receiver 104 are connected by an optical link 106 comprising spans 108 of optical fiber which are coupled by optical amplifiers 110 for signal amplification. The optical amplifiers 110 may comprise, for example, erbium-doped fiber amplifiers (EDFAs), multi-stage EDFAs, hybrid EDFA/discrete Raman amplifiers, semiconductor optical amplifiers, and the like. According to some examples, the spans 108 may be ~80 km in length. For simplicity, only three spans 108 and three optical amplifiers 110 are illustrated in the optical link 106. However, the number of spans 108 and the number of optical amplifiers 110 in an optical link may be much larger.

The transmitter 102 may be configured to generate an optical signal 112 for transmission via the link 106 to the receiver 104. According to some examples, the optical signal 112 may be representative of digital information or data in the form of bits or symbols. The receiver 104 may be configured to receive an optical signal 114 output by the optical link 106. According to some examples, the optical signal 114 may comprise a degraded version of the optical signal 112 generated by the transmitter 102, where the degradation is caused by various impairments in the link 106. For example, the optical signal 114 detected at the receiver 104 may include degradation caused by polarization mode dispersion (PMD), polarization dependent loss or gain (PDL or PDG), state of polarization (SOP) rotation, amplified spontaneous emission (ASE) noise, chromatic dispersion (CD), nonlinear noise, and other effects. The degree of signal degradation may be characterized by an optical signal-to-noise ratio (OSNR).

The transmitter 102 and the receiver 104 may be configured for optical communications using a variety of mechanisms, including coherent and non-coherent modulation. For example, the transmitter 102 and the receiver 104 may be configured for optical communications using Non Return to Zero (NRZ), Pulse Position Modulation (PPM), Differential Phase Shift Keying (DPSK), Quadrature Phase Shift Keying (QPSK), Pulse Amplitude Modulation (PAM), Quadrature Amplitude Modulation (QAM), and the like. In general, the technology described herein may be applicable to any type of optical communications performed via an optical fiber link.

The transmitter 102 and the receiver 104 may include numerous elements that are not explicitly illustrated in FIG. 1, but will be familiar to those of ordinary skill in the art of optical communications. For example, the transmitter 102 and the receiver 104 may each comprise a digital signal processor (DSP) configured to perform a variety of operations. For example, a DSP of the transmitter 102 may be operative to process data symbols by performing one or more of pulse shaping, CD pre-compensation, and distortion pre-compensation, while a DSP of the receiver 104 may be operative to perform equalization processing designed to compensate for a variety of linear and nonlinear channel impairments.

According to some examples, the transmitter 102 may comprise circuitry configured to apply forward error correction (FEC) encoding to the data symbols, such that the optical signal 112 is encoded in accordance with a chosen FEC scheme. In such cases, the receiver 104 may comprise circuitry configured to recover estimates of the data symbols from the optical signal 114 using FEC decoding based on the chosen FEC scheme.

Although not explicitly illustrated in FIG. 1, the optical communication system 100 may comprise additional transmitters, additional receivers, and additional links, as well as optical multiplexers, optical de-multiplexers, wavelength selective switches, optical filters, and the like. The link 106 may support simultaneous transmission of more than one modulated optical carrier on any span 108.

Traditionally, the optical fiber comprised in each span 108 has a solid core made of glass. Examples of fiber types are described in, but not restricted to the International Telecommunication Union (ITU) standards G651.1, G.652, G.653, G.654, G.655, G.656, G.657 and the like. The amount of attenuation loss in a length of fiber may depend on the fiber type(s) that make up that length.

Figure 2:
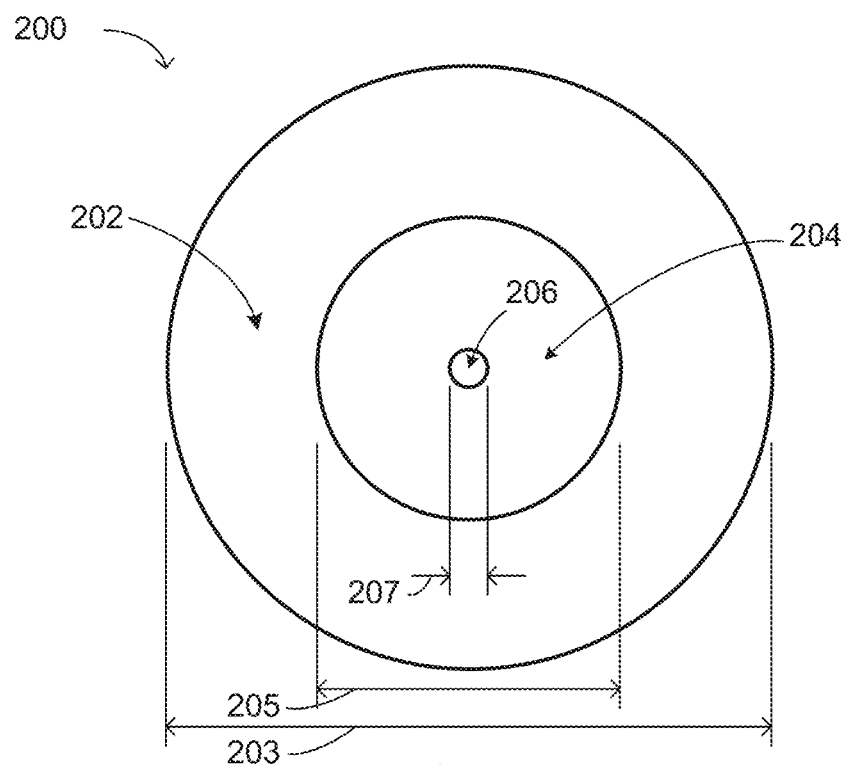
FIG. 2 illustrates a cross section of a conventional optical fiber in accordance with some examples of the prior art.

FIG. 2 illustrates a cross section of conventional optical fiber 200, in accordance with some examples of the prior art.

The optical fiber 200 comprises a coating 202, a cladding 204, and a core 206. An outer diameter of the coating 202 is denoted by 203. An outer diameter of the cladding 204 is denoted by 205. An outer diameter of the core 206 is denoted by 207.

According to some examples, the outer diameter 203 of the coating 202 may be on the order of 250 μm, and the outer diameter 205 of the cladding 204 may be on the order of 125 μm.

According to some examples, the coating 202 may comprise one or more coats of a plastic material to protect the optical fiber 200 from its environment. A metallic sheath (not shown) may also be added to coating 202 to provide further physical protection.

The optical fiber 200 acts as a waveguide for a number of propagation modes, each mode being characterized by a different electric field distribution within the cross section of the optical fiber 200. The number of modes and the properties of the different modes depend on the structure of the optical fiber 200. Modes that are confined to the core 206 of the optical fiber 200 may be referred to as core-guided modes, while modes that extend into the cladding 204 may be referred to as cladding modes.

A conventional optical fiber, such as the optical fiber 200, generally has a core that consists of a solid material, such as glass or plastic. Accordingly, such fiber may be referred to as solid core (SC) optical fiber. According to some examples, both the cladding 204 and the core 206 may comprise solid glass, but with the core 206 being distinguished from the cladding 204 by virtue of a slightly higher effective index of refraction. For example, the core 206 may have an index of refraction that is on the order of 0.3% to 1% higher than the index of refraction of the surrounding cladding 204. According to some examples, the index of refraction may vary within the core 206 as a function of the distance from the center of the core 206. A profile for the index of refraction within the core 206 may be selected such that the expectation of the index over the mode intensity profile is an effective index that has certain desired waveguide properties for different wavelengths. The higher effective index of refraction of the core 206 may be achieved by the addition of a dopant. For example, the cladding 204 and the core 206 may comprise silicon dioxide having an index of refraction of 1.45 at 1.5 microns, while the core 206 may additionally comprise germanium, which results in an index of refraction of 1.46 at 1.5 microns. It is this compositional change caused by the dopant, and the resulting difference in the index of refraction between the cladding 204 and the core 206, that causes the cladding 204 and the core 206 to act, together, as a waveguide for light transmitted on the optical fiber 200. The glass structure of the cladding 204 and the core 206 causes the light to scatter in all directions, but most of the energy and intensity of the light is confined to the core 206, and there is little penetration of the light into the cladding 204.

Where the optical fiber 200 is a single-mode fiber (i.e., a fiber having a single core-guided mode per polarization), the outer diameter 207 of the core 206 may be on the order of 3 µm to 10 µm. Where the optical fiber 200 is a multi-mode fiber (i.e., a fiber having multiple core-guided modes per polarization), the outer diameter 207 of the core 206 may be on the order of 50 µm to 1500 µm.

According to some examples, a multi-mode SC optical fiber having a radially symmetric refractive index profile may support a plurality of linearly polarized (LP) modes denoted by $LP_{\iota m}$, where $\iota$ denotes an integer equal to or greater than zero, and where m denotes an integer equal to or greater than one. The mode index $\iota$ describes angular dependence of the transverse electric field distribution (i.e., within a cross section of the fiber), while the mode index m describes the radial dependence of the transverse electric field distribution. The lowest-order mode, $LP_{01}$, may be referred to as the fundamental mode. Other modes (for example, where $\iota>0$ and/or where m>1) may be referred to as higher-order modes. The field distribution of the fundamental mode is Gaussian-like with no zeros, while the field distribution for higher-order modes has zeros.

Micro-structured optical fiber (MOF) generally has a cladding formed from a micro-structure comprising an arrangement of air holes separated by glass membranes. The glass membranes may be arranged in a variety of ways, such that the air holes may be periodic or non-periodic. In some examples, the cladding may comprise a plurality of glass tubes. In other examples, the cladding may comprise a lattice of thin glass struts which are interconnected at nodes, such that a cross section of the fiber exhibits a cladding having the appearance of a honeycomb. Depending on the arrangement of membranes or tubes within the cladding, light is confined primarily to the core in one of two different ways: (1) constructive interference of scattered light (including the photonic bandgap effect); or (2) total internal reflection. Together, the cladding and the core form a waveguide for light transmitted on the MOF.

The primary sources of propagation loss in SC optical fiber are scattering and absorption due to interactions between the light transmitted on the SC optical fiber and the solid material comprised in the waveguide. The amount of scattering is dependent on the wavelength of transmission as well as uniformity and size of the effective refractive index of the medium through which the light is being transmitted. A vacuum or a gas medium has refractive index that is significantly lower than that of a solid medium. Thus, reduced scattering may be achieved by replacing the solid material of the core with a vacuum or a gas, such as air.

Optical fiber that does not comprise a solid core may herein be referred to as hollow core fiber (HCF). Hollow core micro-structured optical fiber (HC-MOF) has garnered particular interest due to its potential for high propagation speeds, low propagation loss, and low non-linearity. This is in contrast to conventional SC optical fiber, which exhibits four wave mixing (FWM) and nonlinearities caused by Raman scattering and stimulated Brillouin scattering (SBS) that limit usable transmission light intensities and, consequently, the achievable received signal quality.

HC-MOF that relies on the photonic bandgap effect to confine light within the hollow core may be referred to as hollow core photonic bandgap fiber (HC-PBGF) or hollow core photonic crystal fiber (HC-PCF). The cladding of HC-PBGF may comprise an outer cladding and an inner cladding. The outer cladding may be comprised substantially of solid glass, while the inner cladding may comprise a lattice of glass walls or struts which intersect at nodes. According to one example, excluding the coating, the outer cladding may cover approximately 50% of the fiber cross section, the inner cladding may cover approximately 40% of the fiber cross section, and the hollow core may cover the remaining 10% of the fiber cross section. However, many other HC-PBGF structures are possible. At frequencies within the air bandgap, the light is anti-resonant with the nodes in the inner cladding and is therefore radially back-scattered to the core. As a result, there is very little radiation leakage from the core. Instead, loss in HC-PBGF is primarily due to surface scattering loss (SSL) from the air-glass interfaces formed by the struts. With proper engineering HC-PBGF may maintain good propagation properties over a large range of wavelengths, including those used in the conventional telecommunication window (C-band) of 1525 nm to 1565 nm.

HC-PBGF is described in more detail, for example, by Mangan et al. in "Low loss (1.7 dB/km) hollow core photonic bandgap fiber", *Optical Fiber Communications Conference*, 2004; by Buczynski in "Photonic Crystal Fibers", *Proceedings of the XXXIII International School of Semiconducting Compounds*, Jaszowiec, Vol. 106, No. 2, 2004; by Foroni et al. in "Guiding properties of silic/air hollow core Bragg fibers", *J. Lightwave Technology*, vol. 23, no. 14, 2008; by Kuschnerov et al. in "Data Transmission through up to 74.8 km of Hollow-Core Fiber with Coherent and Direct-Detect Transceivers", *European Conference on Optical Communication* 2015, ID: 0049, 2015; by Kuschnerov et al. in "Transmission of Commercial Low Latency Interfaces Over Hollow-Core Fiber", *Journal of Lightwave Technology*, Vol. 34, No. 2, 2016; by Buet et al. in "Nondestructive Measurement of the Roughness of the Inner Surface of Hollow Core-Photonic Bandgap Fibers", *Optics Letters*, Vol. 41, Issue 21, 2016; by Chen et al. in "Demonstration of a Wide Bandwidth, Low Loss Hollow Core Photonic Bandgap Fiber in the 1.55 um Wavelength Region", *5th Workshop on Specialty Optical Fiber and Their Applications*, 2017; by Kim et al. in "Free Space based Hollow Core Fiber Interconnection and Associated In-Line Components", *Optical Fiber Communications Conference and Exhibition* 2019; and by Slavik et al. in "Ultralow Thermal Sensitivity of Phase and Propagation Delay in Hollow-Core Fibres", 2017 *European Conference on Optical Communications*, 2017.

HC-MOF that relies on total internal reflection to confine light within the hollow core may be referred to as hollow core anti-resonant fiber (HC-ARF). The cladding of HC-ARF typically comprises an arrangement of glass membranes forming a bank of partial reflections which may be configured to confine light primarily to the hollow core. The micro-structure may be designed such that light is anti-resonant with the glass membranes, and the light intensity is minimized at the air-glass interfaces. Therefore, in contrast to HC-PBGF, HC-ARF may exhibit very low SSL. Examples of HC-ARF designs are described, for example, by Mousavi et al. in "Broadband high birefringence and polarizing hollow core antiresonant fibers", *Optics Express*, Vol. 24, No. 20, 2016; by Nawazuddin et al. in "Lotus Shaped Negative Curvature Hollow Core Fiber with 10.5 dB/km at 1550 nm Wavelength", *Journal of Lightwave Technology*, Vol. 36, Issue 5, 2018; by Bradley et al. in "Modal content in hypocycloid Kagome hollow core photonic crystal fibers", *Optical Society of America*, Vol. 24, Issue 14, 2016; by Hayes et al. in "Antiresonant Hollow Core Fiber with Octave Spanning Bandwidth for Short Haul Data Communications", in *Optical Fiber Communications Conference and Exhibition*, 2016; by Hayes et al. in "Antiresonant Hollow Core Fiber with Octave Spanning Bandwidth for Short Haul Data Communications", *Journal of Lightwave Technology*, 1-5, DOI: 10.5258/SOTON/397853, 2016; by Richardson et al. in "New optical fibres for high-capacity optical communications", *Philosophical Transactions of the Royal Society* A 374: 20140441, 2016; by Wheeler et al. in "Low Loss Kagome Hollow Core Fibers Operating from the Near- to the Mid-IR", *Optics Letters*, Vol. 42, Issue 13, 2017; and by Ravaille et al. in "In-situ measurement of backscattering in hollow-core fiber based resonant cavities", *IEEE Photonics Journal*, 1-5, DOI: 10.1109/JPHOT.2017.2713441, 2017.

Until relatively recently, HC-ARF had been considered inherently more lossy than HC-PBGF due to the dominance of radiation leakage. However, with recent advances in the design of HC-ARF, these losses have been significantly reduced, to the extent that some HC-ARF has been shown to have faster propagation speeds than conventional SC optical fiber and, theoretically, to have fundamentally lower loss than conventional SC optical fiber. A relatively new class of HC-ARF, referred to as nested anti-resonant nodeless fiber (NANF), uses nested glass capillary tubes to form an anti-resonant structure which tightly confines the optical mode to the central air region, minimizing optical mode overlap with glass sidewalls. NANF may be designed to achieve losses similar to standard single-mode fiber, as described by Jasion et al. in "Hollow Core NANF with 0.28 dB/km Attenuation in the C and L Bands", *Optical Fiber Communications Conference* 2020. Additional NANF work has been presented by Bradley et al. in "Record Low-Loss 1.3 dB/km Data Transmitting Antiresonant Hollow Core Fibre", *European Conference on Optical Communication*, 2018, and by Jasion et al. in "Novel Antiresonant Hollow Core Fiber Design with Ultralow Leakage Loss Using Transverse Power Flow Analysis", *Optical Fiber Communications Conference and Exhibition*, 2019.

HC-ARF holds the prospect of radical improvement to the reach and/or capacity vis-a-vis conventional SC optical fiber on three fronts. Firstly, lower loss and lower nonlinearity may offer higher received signal quality at any given transmission intensity. Secondly, linear transmission effectively removes limits on transmission intensity, thereby providing for higher received signal quality by means of higher transmission intensity. Thirdly, the wavelength window of low loss can be more than two times wider in HC-ARF, allowing double the throughput of SC fiber.

The use of HC-ARF in place of conventional SC optical fiber may be valuable in numerous applications. For example, high-speed trading on the stock market is dependent on the relative transaction delays of competing transactions. The ability to reduce a transaction delay by several nanoseconds through the use of HC-ARF may have a high monetary value. In another application, the use of HC-ARF may be valuable for communication between data centers. For example, the physical distance between data centers may be limited by the propagation delay of optical communications between the data centers. If the data centers are located too far apart from one another, issues such as timing jitter may pose problems. The ability to reduce propagation times through the use of HC-ARF may provide more locations for prospective data centers in relation to originating data centers. Thus, HC-ARF may allow virtual machines to tolerate greater physical distances, on the order of metro reaches. In yet another application, the reduced propagation losses achievable with HC-ARF may allow for increased distances between optical amplifiers in submarine lines, thereby reducing the costs associated with these lines. Moreover, dry air, vacuum or other gas can have a vanishingly small nonlinear behavior nearly eliminating limitations such as FWM, Raman scattering, and Brillouin scattering that are present in conventional SC optical fiber.

Referring to the optical communication system 100 illustrated in FIG. 1, the security of the fiber optic link 106 is an important consideration when transmitting sensitive data from the transmitter 102 to the receiver 104. Sensitive data may include, for example, classified government communications, sensitive financial information, proprietary corporate information, and the like. The optical fiber spans 108 comprised in the link 106 may be vulnerable to unauthorized intrusion by an eavesdropper seeking to access the sensitive data. An intrusion may be understood as a physical perturbation or disruption of the structure of an optical fiber for the purpose of tapping or tampering with signals conveyed by the optical fiber. For example, signal tapping a conventional optical fiber may involve removing its protective coating, thinning its cladding layer via mechanical or chemical methods, and bringing a second strand of fiber (also with its cladding removed) into close proximity with the fiber being tapped. A small fraction of light may be coupled out of the tapped fiber into the second strand, thereby permitting eavesdropping of the signal transmitted on the tapped fiber.

Various means have been used to secure conventional optical fiber. In one example, physical access to the optical fiber may be limited, for example, by encasing the optical fiber in a concrete duct. However, this security mechanism is extremely expensive, and may be limited to short links with controlled rights of way. In another example, security may be maintained by monitoring the transmitted light intensity in the optical fiber for signs of intrusion. For example, an unexpected loss in signal power may indicate that a signal tap has been placed somewhere in the link. Unfortunately, however, a small tap is generally sufficient for extracting signal, while the coupling loss incurred by that tap (on the order of one percent or less, for example) may be easily obscured by natural optical power variations associated with thermal and mechanical stresses, optical amplifier noise, etc. Therefore, network operators and end users may be completely unaware of a compromised link. Similarly, using optical time-domain reflectometry (OTDR) to detect fiber loss perturbations in a span of conventional SC fiber is not very reliable, as the Rayleigh backscatter throughout the SC fiber typically overwhelms reflections resulting from localized perturbations of the fiber. In another example, SOP of the signal may be monitored at the receiver for unexpected fluctuations. Again, SOP has high background fluctuations in typical terrestrial fiber links, such that differentiation of an intrusion-related perturbation from the background fluctuations may be unreliable, especially if such intrusion is done in a slow manner.

Figure 3:
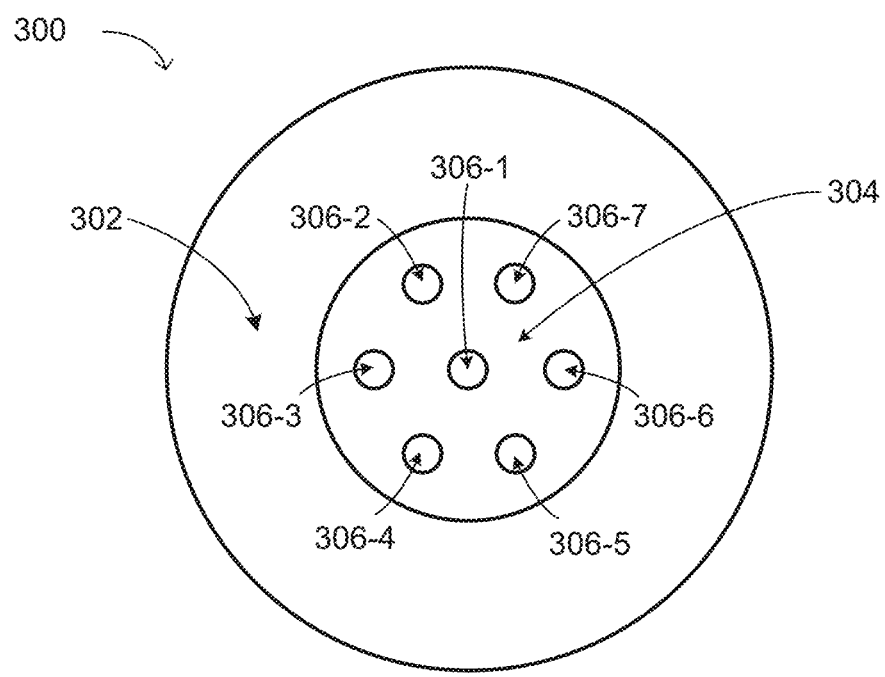
FIG. 3 illustrates a cross section of a multi-core optical fiber in accordance with some examples of the prior art.

Another technique for guarding against eavesdropping of sensitive data is the use of multi-core optical fiber. FIG. 3 illustrates a cross section of multi-core optical fiber 300, in accordance with some examples of the prior art.

Similarly to the optical fiber 200, the multi-core optical fiber 300 comprises a coating 302 and a cladding 304 having similar properties to the coating 202 and the cladding 204, respectively. However, in place of the single core 206, the multi-core optical fiber 300 comprises seven cores denoted by 306-1, 306-2, 306-3, 306-4, 306-5, 306-6, and 306-7 which are distributed throughout the cladding 304. Each of the cores 306-1, 306-2, 306-3, 306-4, 306-5, 306-6, and 306-7 may have properties similar to those of the core 206. In this example, the core 306-1 is located at the center of the cladding 304 and is surrounded by the cores 306-2, 306-3, 306-4, 306-5, 306-6, and 306-7. According to some examples, the multi-core optical fiber 300 may be configured for secure communication by using the core 306-1 (i.e., the central core) to transmit a sensitive data signal and using the cores 306-2, 306-3, 306-4, 306-5, 306-6, and 306-7 (i.e., the outer cores) to transmit one or more obfuscating signals, such as noise. Any attempt to gain physical access to the central core 306-1 would necessarily disrupt the noise signals in the outer cores 306-2, 306-3, 306-4, 306-5, 306-6, and 306-7, which could provide an indication of an intrusion. However, careful physical removal of the cladding 304 could be used to access the outer cores 306-2, 306-3, 306-4, 306-5, 306-6, and 306-7 and strip out the noise, thereby allowing the central core 306-1 to be accessed with a small signal tap. A second downstream access point could be used to reinject the noise into outer cores 306-2, 306-3, 306-4, 306-5, 306-6, and 306-7, thereby preventing the receiver from detecting the intrusion.

Another technique for securing a fiber optic communication link was proposed by Frankel in U.S. Pat. No. 8,798,455, incorporated by reference herein in its entirety. Frankel demonstrated that the properties of HC-PBGF make that type of optical fiber particularly well suited to the transmission of sensitive information via the fundamental propagation mode. Firstly, it is more difficult to tap a HC-PBGF. For example, a partial coupling from HC-PBGF to a conventional fiber via proximity tangential coupling is not possible, since it would require light to transition from a low-index material to a high-index material. Secondly, even when using a more sophisticated coupler to successfully tap the HC-PBGF, the tapping will induce a very large perturbation in the fundamental mode, which may be detected by a monitoring system. The large fundamental mode losses associated with intrusions in HC-PBGF (relative to the virtually undetectable losses in SC fiber, for example) are due to the inherent structure of the HC-PBGF. Light confinement in the hollow core of the HC-PBGF relies on a precise bandgap structure of the cladding, such that any change to the cladding may severely disrupt the fundamental propagation mode. According to some examples, an intrusion alarm may be set at a loss change threshold that is sufficient to detect intrusions, while avoiding false alarms. According to some examples, an additional alarm may be based on relative loss changes experienced by different wavelengths, thereby further improving intrusion detection and false alarm rejection. According to some examples, security of a given link may be maintained by using intrusion detection alarms to suspend sensitive data transmission until the cause of the alarm is located and eliminated.

Some examples of the technology described herein are presented in the context of a particular type of HCF, namely NANF comprising six nested tubes. However, many other HCF structures are contemplated.

Figure 4:
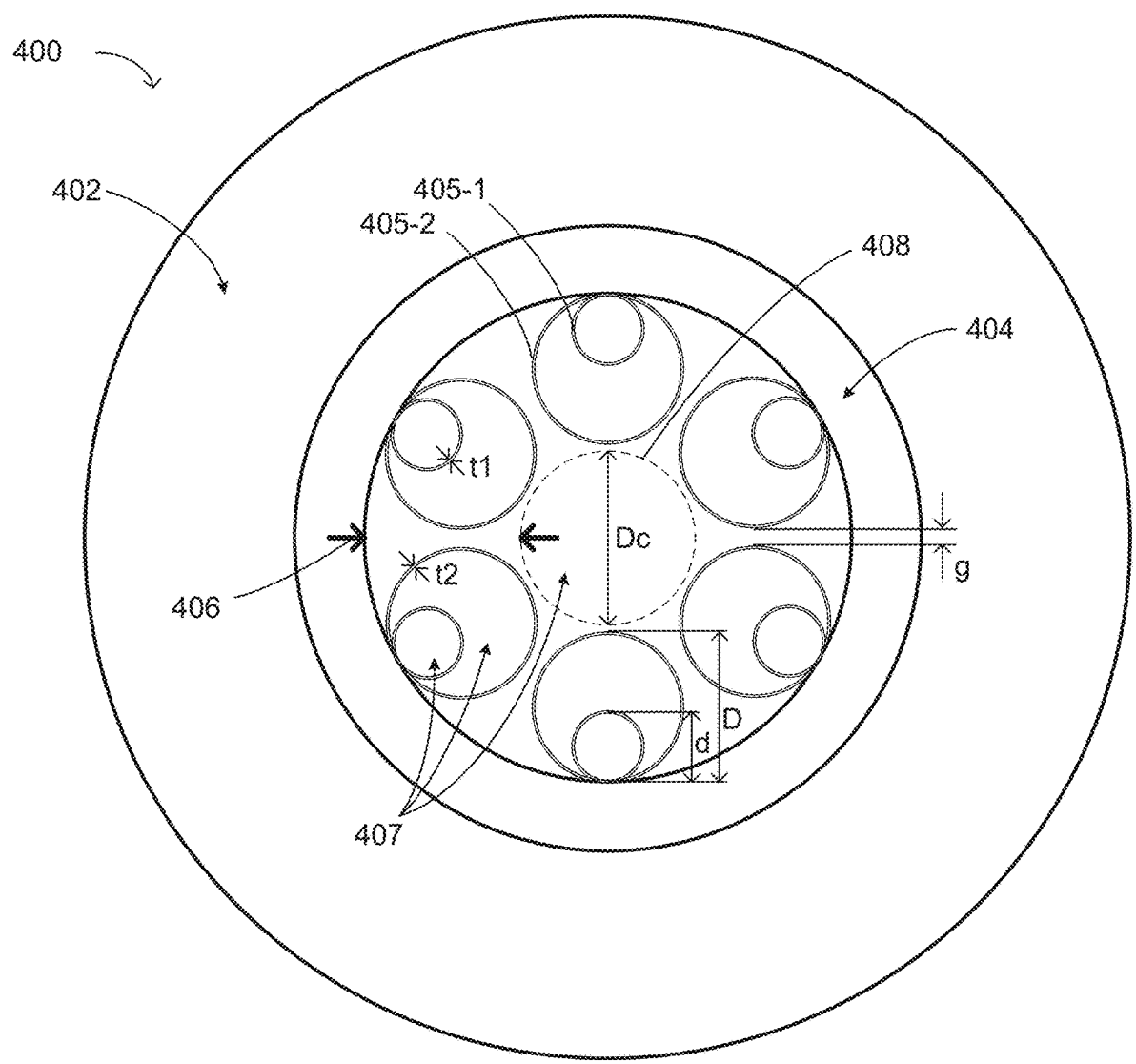
FIG. 4 illustrates a cross section of a hollow core fiber (HCF) in accordance with some examples of the technology disclosed herein.

FIG. 4 illustrates a cross section of HCF 400, in accordance with some examples of the proposed technology. The HCF 400 is NANF comprising six nested tubes.

Similarly to the optical fiber 200 (or 300), the HCF 400 comprises a coating 402, which may comprise one or more coats of a plastic material to protect the HCF 400 from its environment. However, in place of the cladding 204 (or 304) and the core 206 (or 306), the HCF 400 comprises an outer cladding 404, an inner cladding (denoted by the annular region 406), and a hollow core 408. The inner cladding 406 comprises six inner glass tubes 405-1 and six outer glass tubes 405-2, where each inner glass tube 405-1 is nested inside a respective one of the outer glass tubes 405-2. According to some examples, the composition of the outer cladding 404 may be the same as or similar to the compositions of the glass tubes 405-1, 405-2. According to other examples, the outer cladding 404 may be composed of a different material than the glass tubes 405-1, 405-2. The terms "inner cladding" and "outer cladding" are used herein for ease of explanation of the general structure of the example HCF 400, and should not be construed as necessarily limiting. The nested glass tubes 405-1, 405-2 are filled with and surrounded by a medium 407 such as air, a noble gas, a vacuum, or some other suitable gas or vapour medium, and are arranged in a regular configuration as an anti-resonant structure.

By using a geometry designed for coherent extinction, the glass tubes 405-1, 405-2 may be configured to primarily confine a fundamental mode of light within a central region of the fiber (e.g., primarily within the hollow core 408). In the case of the HCF 400, the geometry is characterized by the number of sets of nested tubes 405-1, 405-2 (in this case, six), a thickness t1 and a diameter d of the inner tubes 405-1, a thickness t2 and a diameter D of the outer tubes 405-2, a gap g between adjacent pairs of outer tubes 405-2 and a core diameter Dc. An additional geometric property of NANF not considered in this example is a penetration p of the sets of nested tubes 405-1, 405-2 into the outer cladding 404.

In addition to supporting a fundamental mode, the HCF 400 supports a plurality of higher-order modes. The higher-order modes may include core-guided modes and cladding modes. A core-guided higher-order mode may be understood as a higher-order mode for which the majority of the light intensity is confined to the core, while a cladding mode may be understood as a higher-order mode for which the majority of the light intensity is confined to the cladding. In the case of the HCF 400, a cladding mode may be understood more particularly as referring to a higher-order mode for which the majority of the light intensity is confined to the inner cladding 406 (i.e., the nested tubes region).

As will be described in more detail herein, use of HCF, such as the HCF 400, in an optical communication system may offer several unique mechanisms for enhancing the security of optical communications.

One mechanism by which HCF may be used to enhance security of optical communications is by the leveraging of its higher-order propagation modes. To date, HCF has been configured to act substantially as a single-mode fiber by optimizing the structural properties of the HCF to maximize light propagation in the fundamental mode, while suppressing or minimizing light propagation in the higher-order modes. For example, with respect to the HCF 400, Habib et al. described the optimization of the geometry of the glass tubes 405-1, 405-2 to suppress higher-order modes in "Impact of cladding elements on the loss performance of hollow-core anti-resonant fibers", *Optics Express*, vol. 29, no. 3, 2021. By minimizing light propagation in the higher-order modes, the OSNR of the signal transmitted on the fundamental mode may be enhanced.

Instead of configuring HCF to act as a single-mode fiber by transmitting a data signal on the fundamental propagation mode and suppressing the higher-order propagation modes, the inventors propose using at least one of the higher-order modes to transmit an obfuscating signal designed to conceal the data signal, thereby enhancing the security of optical communications on HCF. The obfuscating signal may comprise noise, such as amplified spontaneous emission (ASE), or some other signal, such as a modulated signal, suitable for concealing the data signal. The obfuscating signal may be designed to substantially overlap the data signal in spectral content. For example, given a channel modulated with a 50-Gbaud data signal that is centered at the ITU frequency of 193.0 THz and has a spectral width of approximately 50 GHz, the obfuscating signal may be designed to have optical power in the same spectral region of 192.975 THz to 193.025 THz (i.e., 193.0 THz±25 GHz).

Figure 5:
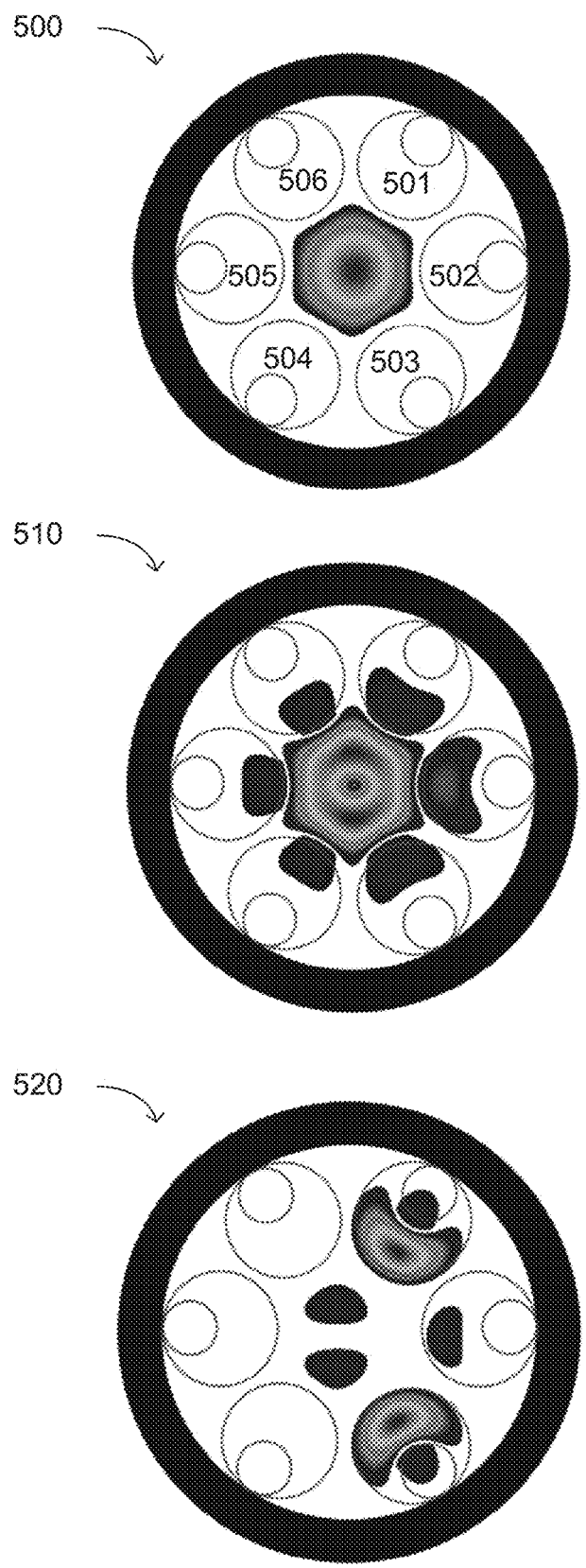
FIG. 5 illustrates example mode-field profiles of a fundamental mode, a higher-order core-guided mode, and a higher-order cladding mode of the HCF in FIG. 4.

FIG. 5 illustrates example mode-field profiles of a fundamental mode, a higher-order core-guided mode, and a higher-order cladding mode for one example geometry of the HCF 400, at a wavelength $\lambda=1.55$ μm. These plots were reproduced from FIG. 5 of Habib et al., "Impact of cladding elements on the loss performance of hollow-core anti-resonant fibers", *Optics Express*, vol. 29, no. 3, 2021. The six sets of nested tubes in the NANF are denoted by 501, 502, 503, 504, 505, and 506, respectively.

The intensity of light transmitted in the fundamental mode 500 may exhibit a Gaussian-like distribution which is confined to the hollow core. The intensity of light transmitted in a higher-order core-guided mode 510 extends into the inner cladding of the NANF (i.e., the nested-tubes region), but a majority of the intensity remains within the hollow core. The intensity of light transmitted in a higher-order cladding mode 520 is confined primarily within the nested tubes 501 and 503 of the inner cladding, with portions extending into the nested tubes 502 and the core. Although not illustrated in FIG. 5, there are numerous additional higher-order modes, including core-guided modes such as the mode 510 and cladding modes such as the mode 520.

In accordance with some examples of the technology proposed herein, one or more of the higher-order propagation modes of HCF may be used to enhance security of HCF-based optical communications. While a data signal is being transmitted on the fundamental mode of the HCF, an obfuscating signal may be simultaneously transmitted on at least one higher-order mode supported by the HCF. According to some examples, the at least one higher-order mode used to convey the obfuscating signal may be selected such that data signal is substantially physically surrounded by the obfuscating signal. For example, in addition to transmitting the obfuscating signal on the higher-order cladding mode 520 (which confines the light intensity primarily to the nested tubes 501 and 503), the obfuscating signal may also be transmitted on those higher-order cladding modes which confine the light intensity primarily to the nested tubes 502, 504, 505, and 506. Accordingly, the higher-order modes used to convey the obfuscating signal may be chosen such that they physically surround the fundamental mode used to convey the data signal. By selecting higher-order modes which confine the intensity of the obfuscating signal to an annular region substantially surrounding the core of the HCF, the obfuscating signal may guard the data signal from eavesdropping in several important ways.

Firstly, by physically surrounding the data signal with an obfuscating signal that substantially overlaps the data signal in spectral content, a signal tapping attempt made on the HCF is expected to simultaneously detect both the data signal and the obfuscating signal in a generally inseparable way. The data signal may be swamped by the obfuscating signal such that the data signal is unrecoverable by a would-be eavesdropper.

Secondly, just as an intrusion of the HCF is expected to incur a measurable signal loss of the data signal in the fundamental mode, the intrusion may also incur a measurable signal loss of the obfuscating signal in the at least one higher-order mode. Thus, a power loss detected in the at least one higher-order mode may provide an additional intrusion warning. Moreover, because the at least one higher-order mode physically surrounds the fundamental mode, a power loss in the obfuscating signal may be detected prior to a power loss in the data signal, thereby providing an earlier intrusion warning.

In order to sustain optical propagation of the obfuscating signal along the HCF, the structural properties of the HCF may be designed to minimize (or reduce or limit) propagation loss in the at least one higher-order mode used to convey the obfuscating signal. That is, rather than selecting the HCF structural properties to suppress all higher-order modes (as has been done previously), the HCF structural properties may be selected to sustain the at least one higher-order mode on which the obfuscating signal is conveyed. In general, the structural properties of the HCF may be designed to optimize propagation loss in the fundamental mode and in the at least one higher-order mode such that (i) the OSNR of the fundamental-mode signal detected by a receiver at a distal end of the HCF is sufficiently high for recovery of the data signal therefrom, and (ii) the power of the obfuscating signal detected at the distal end, $P_{OBF,DIST}$, is sufficiently high relative to the power of the data signal detected at the distal end, $P_{SIG,DIST}$, to thwart an attempted eavesdropping of the data signal at that location. To satisfy (i), the system properties (including the length and structure of the HCF, described in more detail below) and the relative powers of the data signal and the obfuscating signal input at a proximal end of the HCF may be selected such that the fundamental-mode signal detected by the receiver at the distal end of the HCF meets or exceeds a required OSNR (ROSNR) of the receiver, such as $ROSNR_{dB}=17$ dB/0.1 nm. This will be described in more detail with respect to FIG. 7. To satisfy (ii), the system properties and/or choice of signal powers may depend on the anticipated characteristics of a tapped signal. For example, a signal tap of the HCF may couple 20 dB more of the obfuscating signal relative to the data signal. In the event that $ROSNR_{dB}=17$ dB/0.1 nm for successful data signal recovery, and assuming a signal bandwidth of 50 GHz and an optical measurement bandwidth of 12.5 GHz, the relative powers of the data signal and the obfuscating signal at the distal end may be required to satisfy $$P_{SIG,DIST} - (P_{OBF,DIST} + 20) < 17 - 10 \cdot \log_{10}(50 \text{ GHz}/12.5 \text{ GHz}), \quad [1]$$

which may be simplified as $$P_{SIG,DIST} - P_{OBF,DIST} < 31 \text{ dB}.$$

That is, provided that the distal-end power of the data signal $P_{SIG,DIST}$ does not exceed the distal-end power of the obfuscating signal $P_{OBF,DIST}$ by more than 31 dB, a would-be eavesdropper may be unable to successfully recover the data signal.

The relevant structural properties for optimizing HCF propagation loss in the fundamental mode and the at least one higher-order mode depends on the particular type of HCF being used. Structural properties may include the constituent materials of the HCF and their respective refractive indices, geometry, architecture, and the like. For example, in the case of the HCF 400, propagation loss in the fundamental and higher-order modes may be optimized by selecting structural property values including (i) a number of sets of nested tubes in the cladding, each set comprising an inner tube and an outer tube, and/or (ii) a thickness t1 of each inner tube, and/or (iii) a diameter d of each inner tube, and/or (iv) a thickness t2 of each outer tube, and/or (v) a diameter D of each outer tube, and/or (vi) a gap g between adjacent pairs of outer tubes, and/or (vii) a core diameter Dc, and/or (viii) a penetration p.

Figure 6:
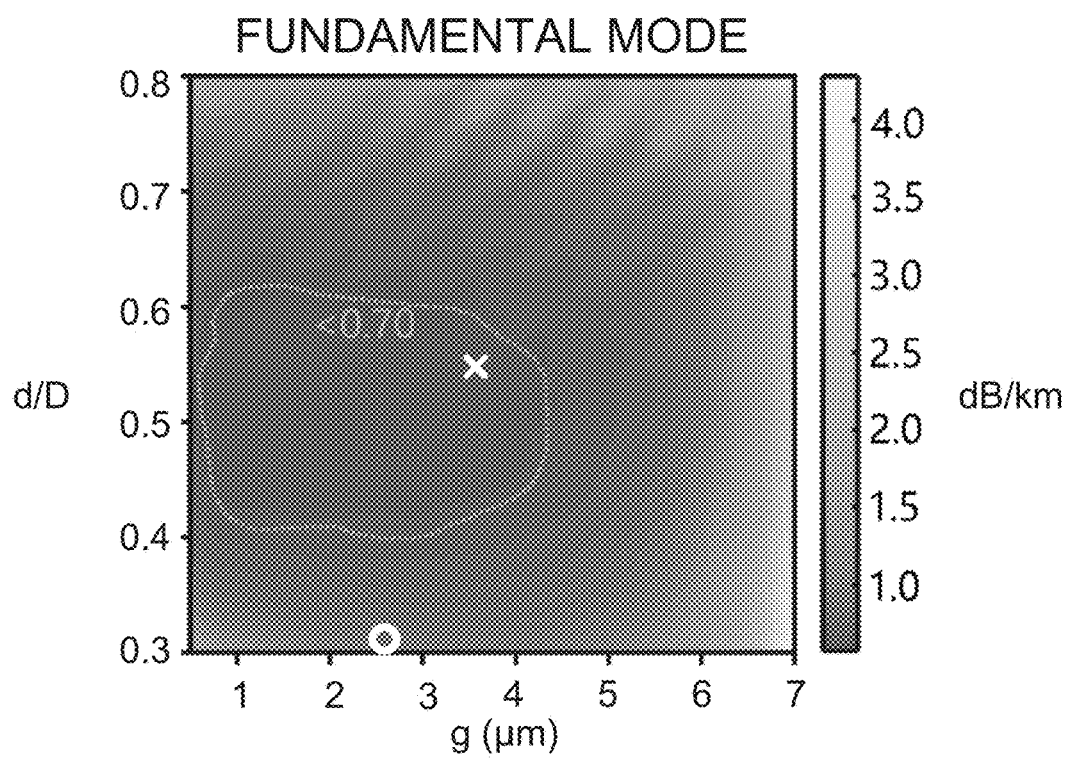
FIG. 6 illustrates example plots of simulated fundamental and higher-order mode propagation loss as a function of HCF structural properties.
Figure 6:
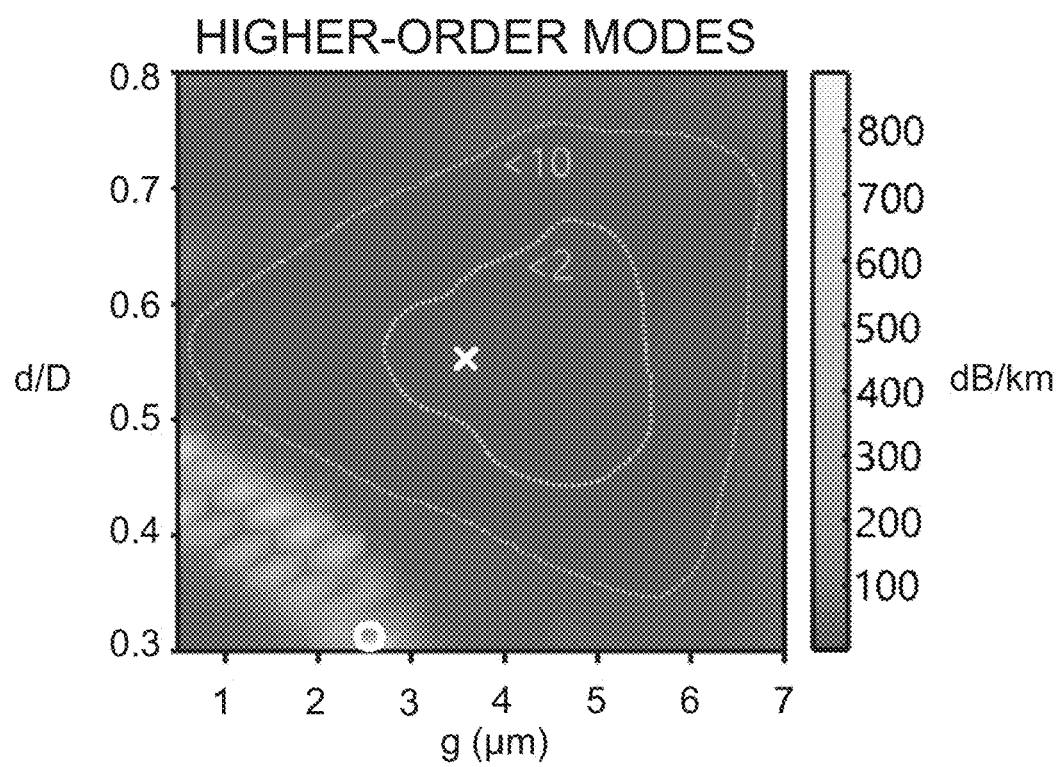

FIG. 6 illustrates example plots of propagation loss as a function of structural properties of the HCF 400 for the fundamental mode (601) and for the higher-order modes exhibiting the lowest propagation loss (602). These plots were reproduced from FIG. 5 of Habib et al., "Impact of cladding elements on the loss performance of hollow-core anti-resonant fibers", *Optics Express*, vol. 29, no. 3, 2021. The plots in FIG. 5 of Habib et al. were obtained using simulations performed at a wavelength λ=1.55 μm for NANF comprising six nested tubes, where the NANF was characterized by a fixed core diameter $D_c$=35 μm, and average silica wall thickness, t1/t2=415/260 nm. The propagation loss in dB/km was plotted as a function of normalized nested tube ratio, d/D, and the gap g in μm. Habib's expressly stated aim was to optimize d/D and g to suppress higher-order modes. As described in Section 3.4 of Habib et al., by choosing d/D=0.3 and g=2.55 μm, the higher-order mode loss can be made >900 dB/km while maintaining the fundamental mode loss slightly higher than 1 dB/km. This set of values for the structural parameters d/D and g is indicated by circles in plots 601 and 602 of the present disclosure.

In contrast to Habib's stated goal of suppressing higher-order modes, the technology proposed herein involves sustaining the at least one higher-order mode used to convey the obfuscating signal, thereby ensuring that the obfuscating signal continues to propagate along the length of HCF to conceal the data signal transmitted in the fundamental mode. Thus, rather than using simulations of propagation loss to select structural properties that achieve high attenuation of the higher-order modes, these simulations may instead be used to design the NANF to limit attenuation of the higher-order modes, while also limiting attenuation of the fundamental mode. For example, as indicated by the X's in plots 601 and 602, by designing the NANF to have the structural properties d/D=0.55 and g=3.5 μm, it is expected that the fundamental mode will have a propagation loss of less than 0.70 dB/km, and that the higher-order modes will have a propagation loss of less than 2 dB/km. In this manner, the structural properties of the NANF may be selected to optimize propagation loss in the fundamental mode used to convey the data signal and in the at least one higher-order mode used to convey the obfuscating signal.

Even with optimization of the HCF structure for sustained propagation of the obfuscating signal, the higher-order modes may have a higher intrinsic attenuation relative to the fundamental mode. Thus, the power of the obfuscating signal is expected to decrease more rapidly along the length of the HCF than the power of a data signal. To counter this, the power of the obfuscating signal injected into the higher-order mode(s) at the input of the HCF may be higher than the power of the data signal injected into the fundamental mode. For example, given 30 km of HCF with 0.7 dB/km fundamental-mode loss and 2 dB/km higher-order-mode loss, and assuming (per the earlier example) that an attempted eavesdropping of the data signal at the distal end of the HCF is thwarted as long as $P_{SIG,DIST}-P_{OBF,DIST}$<31 dB, the proximal-end power of the data signal, $P_{SIG,PROX}$, and the proximal-end power of the obfuscating signal, $P_{OBF,PROX}$, may be selected to satisfy $[P_{SIG,PROX}-0.7\cdot30-(P_{OBF,PROX}-2\cdot30)]$ <31. That is, given a 30-km length of HCF having structural properties selected to achieve 0.7 dB/km propagation loss in the fundamental mode and 2 dB/km propagation loss in the higher-order modes, an eavesdropping attempt of the data signal at the distal end of the HCF may be thwarted provided that the relative powers of the data signal and the obfuscating signal input at the proximal end of the HCF satisfy $P_{OBF,PROX}-P_{SIG,PROX}$>8 dB. For example, a data signal of optical power $P_{SIG,PROX}$=0 dBm that is injected, at the proximal end of the HCF, into the fundamental mode may be protected from eavesdropping along the entire length of the HCF (i.e., up to the distal end) provided that the obfuscating signal that is injected, at the proximal end of the HCF, into the at least one higher-order mode has an optical power of $P_{SIG,PROX}$>8 dBm. Because nonlinear effects are generally negligible in HCF, using a higher power for the obfuscating signal is not expected to significantly degrade the quality of the data signal.

Figure 7:
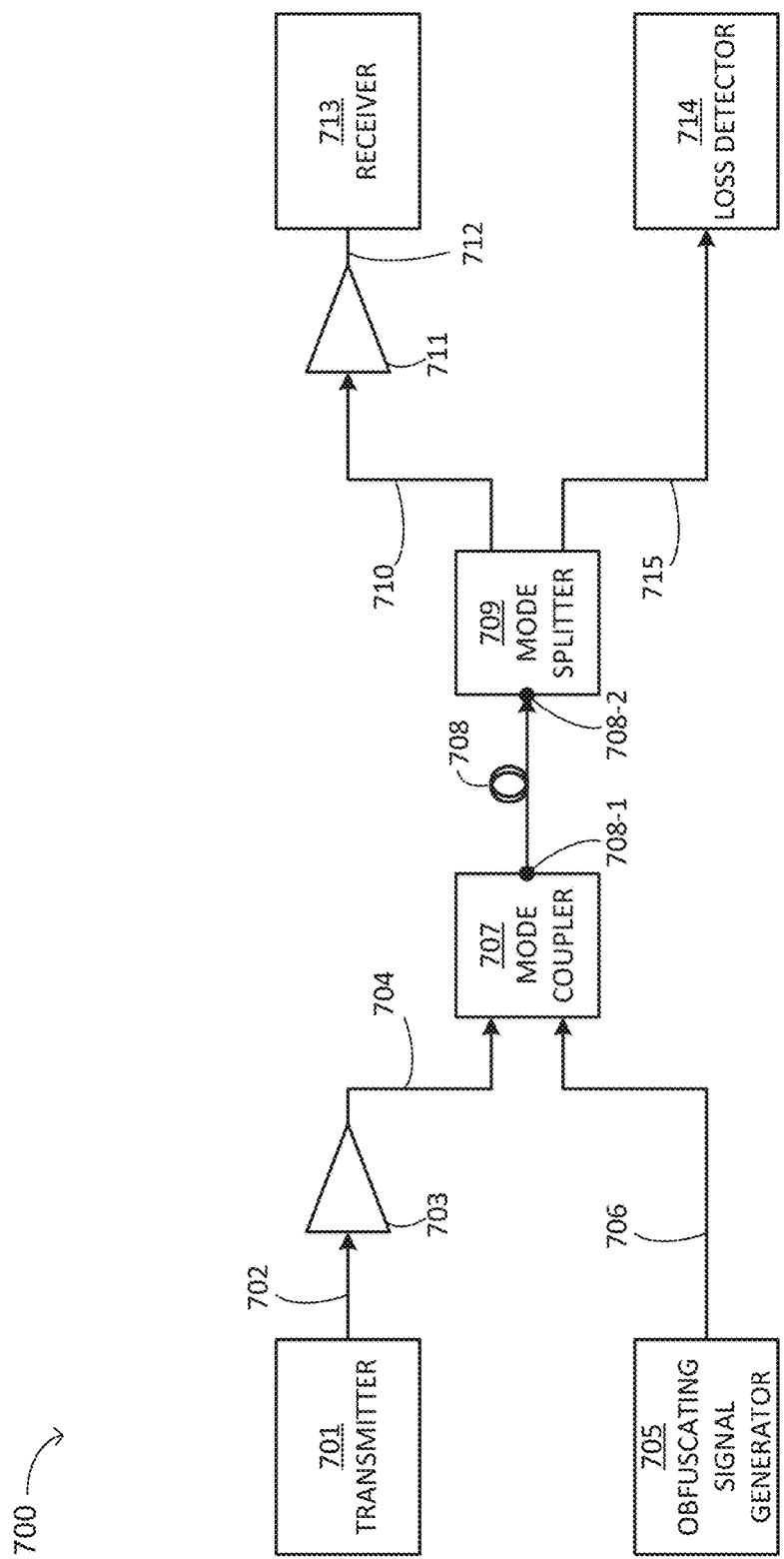
FIG. 7 illustrates an optical communication system configured for secure optical communication using HCF in accordance with some examples of the technology disclosed herein.

FIG. 7 illustrates an example optical communication system 700 configured for secure optical communication using HCF.

The system 700 comprises an optical transmitter 701 that is configured to generate an optical signal 702 representing data, herein referred to as the data signal 702. The data may comprise, for example, sensitive data such as classified government communications, sensitive financial information, proprietary corporate information, or any other data desired to be protected from eavesdropping. The transmitter 701 may comprise, for example, the transmitter 102. According to some examples, the data signal 702 is optionally amplified by an optical amplifier 703 such as an EDFA, thereby resulting in an amplified data signal 704. According to other examples, the optical amplifier 703 is omitted.

The system 700 further comprises an obfuscating signal generator 705 that is configured to generate an optical signal 706 having obfuscating properties, herein referred to as the obfuscating signal 706. Obfuscating properties may comprise properties which facilitate concealment of the data signal 702 from eavesdropping attempts made on a HCF link 708 comprised in the system 700. For example, the obfuscating signal 706 may substantially overlap the data signal 702 in spectral content. According to some examples, the obfuscating signal generator 705 may comprise an ASE source and the obfuscating signal 706 may comprise ASE noise. According to other examples, the obfuscating signal generator 705 may comprise an optical transmitter such as the transmitter 102, configured to generate a modulated dummy signal. The obfuscating signal generator 705 may have an adjustable output power level.

The amplified data signal 704 (or, in the absence of the optical amplifier 703, the data signal 702) and the obfuscating signal 706 may be input, in parallel, to a propagation mode coupler 707. According to some examples, conventional SC fiber may be used to convey signals from the transmitter 701 to the propagation mode coupler 707 (optionally via the optical amplifier 703), and to convey signals from the obfuscating signal generator 705 to the propagation mode coupler 707. The propagation module coupler 707 is connected to a proximal end 708-1 of the HCF link 708. The proximal end 708-1 may be referred to as an input 708-1 of the HCF link 708. Although the HCF link 708 is illustrated as a single span, it is contemplated that the HCF link 708 may comprise a plurality of spans and optical amplifiers. For example, in a metro-type environment, the HCF link 708 may comprise a single-digit number of spans. The mode coupler 707 is configured to condition the data signal 704 such that it is injected into a fundamental mode of the HCF link 708. The mode coupler 707 is also configured to condition the obfuscating signal 706 such that it is injected into one or more higher-order modes of the HCF link 708. Various mode coupling techniques are contemplated. For example, in "Bridging Between Si and Few-Mode Fiber Higher Order Modes", *Conference on Lasers and Electro-Optics*, 2020, Gordillo et al. describe a mode converter that is designed to convert the $TE_{11}$, $TE_{21}$, $TE_{31}$, $TE_{41}$ modes of a multi-mode silicon waveguide into the $TE_{11}$, $TM_{11}$, $TE_{21}$, $TM_{21}$ modes of a polymer waveguide, respectively, which are compatible with the $LP_{01}$ and $LP_{11a}$ modes of a few-mode fiber, where TE denotes transverse electric, and TM denotes transverse magnetic. A silicon on-chip multiplexer excites each of the higher-order modes in the multi-mode silicon waveguide, and 16 cascaded tapered regions convert, one-to-one, the silicon waveguide modes to the polymer waveguide modes. A similar technique may be used to couple an obfuscating signal to at least one higher-order mode of HCF. In another example, the sensitive data signal and the obfuscating signal may be respectively coupled to the fundamental and higher-order mode(s) of HCF using multi-plane light conversion (MPLC). For example, in "Mode Selective 10-Mode Multiplexer based on Multi-Plane Light Conversion", *Optical Fiber Communication Conference*, 2016, Labroille et al. describe a multiplexer that uses MPLC to convert light from ten input single-mode fibers into the first ten modes a conventional graded-index multi-mode fiber. Labroille et al. demonstrated a system with low insertion loss (i.e., 4.4 dB) and high mode selectivity (i.e., average crosstalk of −21 dB) over the C-band and also over the long band (L-band) from 1565 nm to 1625 nm. In yet another example, the data signal and the obfuscating signal may be respectively coupled to the fundamental and higher-order mode(s) of HCF using a fiber-based photonic lantern technique, whereby several conventional single-mode fibers are tapered down and coupled to the HCF. This technique has been demonstrated by Gruner-Nielsen et al. in "Mode Division Multiplexing on Standard 50/125 µm Multi Mode Fiber using Photonic Lanterns", *Optical Fiber Communication Conference*, 2021, with selective mode coupling to conventional multi-mode fiber, but may be applied to HCF as well.

The HCF link 708 is configured to simultaneously convey the data signal 704 and the obfuscating signal 706, in parallel, towards a distal end 708-2 of the HCF link 708 which is connected to a propagation mode splitter 709. The distal end 708-2 may be referred to as an output 708-2 of the HCF link 708. The mode splitter 709 is configured to separate the optical signal detected on the fundamental mode from the optical signal detected on the at least one higher-order mode into which the obfuscating signal was injected at the proximal end 708-2 of the HCF link 708. Various mode splitting techniques are possible, for example, corresponding to the reverse of any of the mode coupling techniques described above, since passive optical circuits, such as those described above, are reciprocal (i.e., backward and forward properties are invertible). The mode splitter 709 may output a first optical signal 710 detected in the fundamental mode and a second optical signal 715 detected in the at least one higher-order mode. The first optical signal 710 may be referred to as the detected data signal 710, while the second optical signal 715 may be referred to as the detected obfuscating signal 715.

According to some examples, the detected data signal 710 is optionally amplified by an optical amplifier 711 such as an EDFA, thereby resulting in an amplified detected data signal 712. According to other examples, the optical amplifier 711 is omitted. The amplified detected data signal 712 (or, in the absence of the optical amplifier 711, the detected data signal 710) may be provided to an optical receiver 713. According to some examples, conventional SC fiber may be used to convey signals from the propagation mode splitter 709 to the receiver 713 (optionally via the optical amplifier 711). The receiver 713 may comprise, for example, the receiver 104. The receiver 713 may be configured to recover the data signal 702 from the amplified detected data signal 712 (or the detected data signal 710). According to some examples, recovery of the data signal 702 at the receiver 713 may involve digital signal processing, such as the digital signal processing performed by the receiver 104. For example, in the event that the data signal 702 has undergone FEC encoding at the transmitter 701, the digital signal processing performed that the receiver 713 may include FEC decoding.

According to some examples, the receiver 713 may additionally be configured to monitor the power of the amplified detected data signal 712 (or the detected data signal 710). As described by Frankel in U.S. Pat. No. 8,798,455, for example, the receiver 713 may be configured to generate an intrusion alarm in response to detecting a loss of power in the amplified detected data signal 712 (or the detected data signal 710). Accordingly, the receiver 713 may provide an intrusion warning indicative of an eavesdropping attempt on the HCF link 708.

In parallel to the processing of the detected data signal 710 for recovery of the data signal 702 (and, optionally, for intrusion monitoring), the detected obfuscating signal 715 may also be monitored for intrusion attempts made on the HCF link 708. The detected obfuscating signal 715 may be provided to a loss detector 714, which may comprise a photodetector or power meter configured to monitor for power losses in the detected obfuscating signal 715. According to some examples, conventional SC fiber may be used to convey signals from the propagation mode splitter 709 to the loss detector 714. The loss detector 714 may be configured to generate an intrusion warning in response to detecting a signal loss above a certain threshold, for example, 1 dB of signal loss. According to some examples, an intrusion warning generated by the loss detector 714 may precede an intrusion warning generated by the receiver 713, since an intrusion of the HCF link 708 may cause signal loss in a higher-order mode (i.e., where the intensity is primarily confined to the cladding) prior to signal loss in the fundamental mode (i.e., where the intensity is primarily confined to the core).

The structural properties of the HCF link 708 may be selected to optimize propagation loss in the fundamental mode and in the at least one higher-order mode. According to some examples, propagation loss may be optimized when, for given respective powers of the data signal 704 (or 702) and the obfuscating signal 706 input at the proximal end 708-1 of the HCF link 708, (i) the OSNR of the fundamental-mode signal detected at the receiver 713 is sufficiently high for recovery of the data signal 702 therefrom, and (ii) the power of the obfuscating signal detected at the distal end 708-2 of the HCF link 708 is sufficiently high to thwart an attempted eavesdropping of the data signal at the distal end 708-2. Thus, the structural properties of the HCF link 708, the power of the data signal 702, and the power of the obfuscating signal 706 may be selected based on the ROSNR of the receiver 713 and the properties of the other elements in the system 700, such as the amplifier 703, the mode coupler 707, the mode splitter 709, and the amplifier 711.

One may consider an example wherein the receiver 713 has ROSNR$_{dB}$=17 dB/0.1 nm. In other words, the amplified detected data signal 712 detected at the receiver 713 must have a minimum OSNR$_{dB}$ of 17 dB/0.1 nm in order for the receiver 713 to be able to recover the data signal 702. For ease of explanation, it is initially assumed that the detected data signal 710 has zero noise power, such that the OSNR of the amplified detected data signal 712 in dB is related to a signal power $P_{IN}$ of the detected data signal 710 in dBm according to the expression $$OSNR_{dB} = P_{IN,dBm} - NF - 10\log_{10}(h\nu B) \qquad [2]$$

where NF denotes a noise figure for the amplifier 711 (assumed to be 6 dB), where h denotes Planck's constant of 6.626070×10$^{-34}$ J/Hz, where ν denotes the photon frequency of 193 THz, and where B denotes the optical measurement bandwidth of 0.1 nm (or 12.48 GHz). With these assumptions, it follows that ROSNR$_{dB}$=17 dB/0.1 nm will be achieved if $P_{IN,dBm}$=17+6−58=−35 dBm. This minimum value for the signal power $P_{IN,dBm}$ of the detected data signal 710 may be used together with the loss properties of the mode coupler 707 and the mode splitter 709 to determine an acceptable value for a signal power $P_{TX,dBm}$ of the amplified data signal 704 and an acceptable fundamental-mode propagation loss FL of the HCF link 708. For example, in the event that the mode coupler 707 incurs a loss of 3 dB and the mode splitter 709 incurs additional loss of 3 dB, the signal power $P_{IN,dBm}$=−35 dBm of the detected data signal 710 may be achieved provided that the following expression is satisfied $$P_{TX,dBm} \geq 3 + FL + 3 + (-35) = FL - 29. \qquad [3]$$

Thus, for example, if the amplified data signal 704 has the signal power of $P_{TX,dBm}$=20 dBm, the HCF link 708 must have a maximum fundamental-mode loss of FL=49 dB in order to satisfy the minimum power of $P_{IN,dBm}$=−35 dBm of the detected data signal 710, as needed to meet ROSNR$_{dB}$=17 dB/0.1 nm required at the receiver 713. The power of the amplified data signal 704 may be selected based, at least in part, on the FL value of the HCF link 708, the length of the HCF link 708, and the ROSNR of the receiver 713. Alternatively, the structural properties and length of the HCF link 708 (which together establish the FL value) may be selected based, at least in part, on the ROSNR of the receiver 713 and the power of the amplified data signal 704. Referring to the mode-field plot 601, NANF having the structural properties d/D=0.55 and g=3.5 µm may achieve a propagation loss of 0.70 dB/km or lower in the fundamental mode. Thus, in the event that the HCF link 708 consists of a single span of NANF having those particular structural properties, the span could have a length of up to 70 km without exceeding the fundamental-mode loss of FL=49 dB.

The above example assumes that the detected data signal 710 has zero noise power. This assumption implies that there is zero crosstalk or coupling between the fundamental mode and the higher-order modes of the HCF link 708. Under these conditions, the power of the obfuscating signal 706 may be arbitrarily large, thus ensuring that the data signal conveyed by the fundamental mode of the HCF link 708 is concealed along the entire length of the HCF link 708, up to the distal end 708-2. In practice, there may be some amount of crosstalk between the different modes of the HCF link 708. This crosstalk may result in non-zero noise power in the detected signal 710, which will ultimately decrease the OSNR of the signal 712 detected at the receiver 713. However, this decrease can be tolerated provided that the OSNR of the signal 712 still meets the ROSNR requirements of the receiver 713. According to some examples, the power of the obfuscating signal 706 may be selected such that the OSNR of the signal 712 is equal to or greater than the ROSNR of the receiver 713. Thus, the maximum power of the obfuscating signal 706 may be dictated, at least in part, by the power of the amplified data signal 704 and the ROSNR of the receiver 713.

It is also contemplated that the obfuscating signal 706 may have a minimum power that is dictated, at least in part, by the power of the amplified data signal 704 and by the structural properties and length of the HCF link 708. For example, in order for the obfuscating signal to provide sufficient eavesdropping protection to the data signal throughout the HCF link 708 (including near the distal end 708-2, where signal attenuation is the highest), the power of the obfuscating signal 706 (at the proximal end of the HCF) may be selected such that, at the distal end 708-2, the relative powers of the data signal and obfuscating signal coupled from the HCF during an attempted signal tapping fail to meet a minimum OSNR for data signal recovery.

Figure 8:
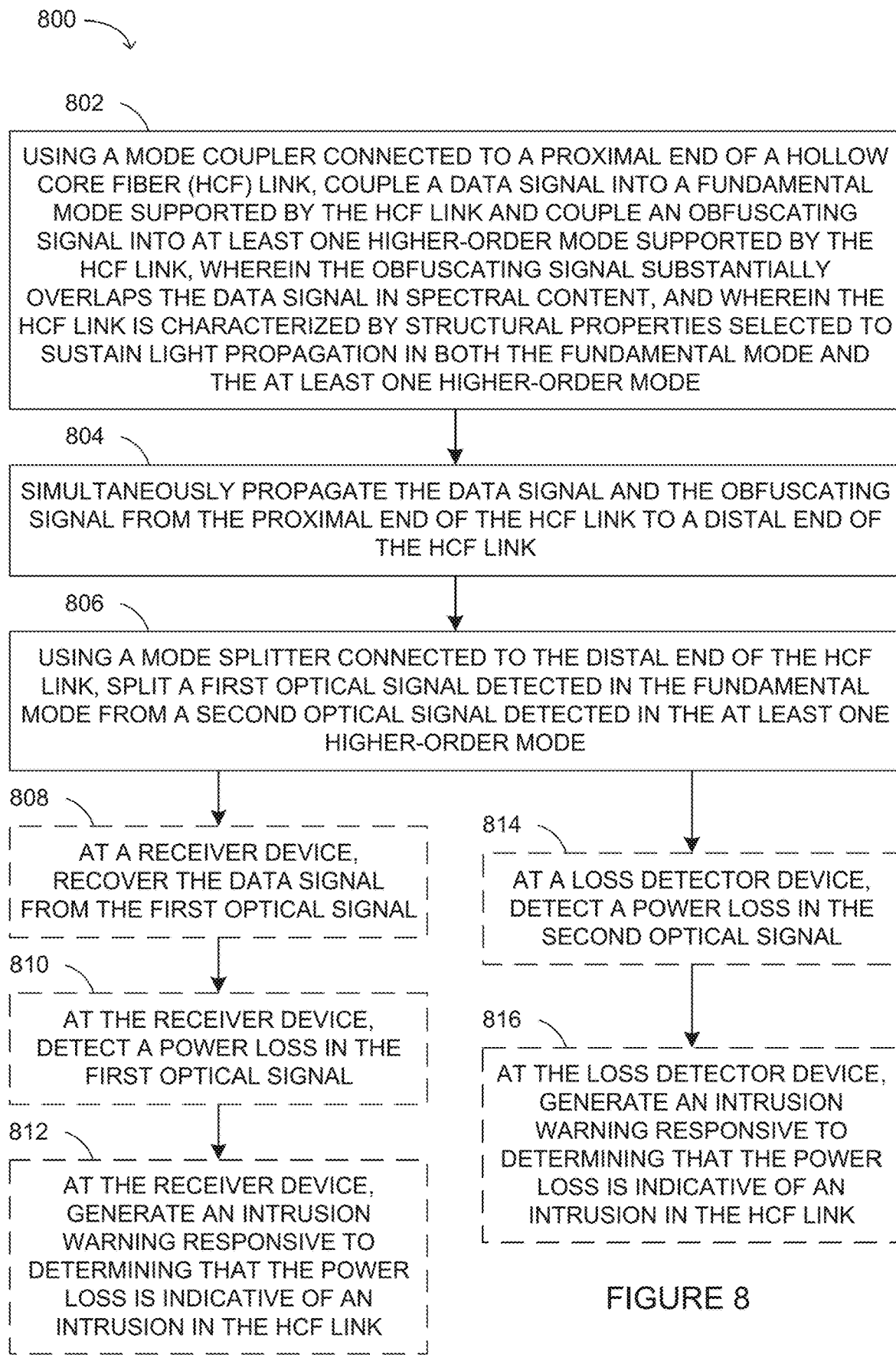
FIG. 8 illustrates a method for secure optical communication using HCF in accordance with some examples of the technology disclosed herein.

FIG. 8 illustrates an example method 800 for secure optical communication using HCF. According to some examples, the method 800 may be performed in the optical communication system 700.

At 802, a propagation mode coupler connected to a proximal end of a HCF link is used to couple a data signal into a fundamental mode supported by the HCF link, and to couple an obfuscating signal into at least one higher-order mode supported by the HCF link, where the obfuscating signal substantially overlaps the data signal in spectral content, and where the HCF link is characterized by structural properties selected to sustain light propagation on both the fundamental mode and the at least one higher-order mode. For example, the mode coupler 707 connected to the proximal end 708-1 of the HCF link 708 is used to couple the amplified data signal 704 (or the data signal 702) into the fundamental mode of the HCF link, and to couple the obfuscating signal 706 into at least one higher-order mode of the HCF link 708.

At 804, the data signal and the obfuscating signal are simultaneously propagated from the proximal end of the HCF link to a distal end of the HCF link. For example, the amplified data signal 704 (or the data signal 702) is propagated on the fundamental mode of the HCF link 708 from the proximal end 708-1 to the distal end 708-2, while the obfuscating signal 706 is propagated on the least one higher-order mode of the HCF link 708 from the proximal end 708-1 to the distal end 708-2.

At 806, a propagation mode splitter connected to the distal end of the HCF link is used to split a first optical signal detected on the fundamental mode from a second optical signal detected on the at least one higher-order mode. For example, the mode splitter 709 connected to the distal end 708-2 of the HCF link 708 is used to split the detected data signal 710 detected on the fundamental mode from the detected obfuscating signal 715 detected on the at least one higher-order mode.

At 808, a receiver device may optionally recover the data signal from the first optical signal. For example, the receiver device 713 may recover the data signal 702 from the detected data signal 710 (or from the amplified detected data signal 712).

At 810, the receiver device may optionally detect a power loss in the first optical signal. At 812, the receiver device may optionally generate an intrusion warning responsive to determining that the power loss detected at 810 is indicative of an intrusion in the HCF link. For example, the receiver device 713 may be configured to monitor for power losses in the detected data signal 710 (or the amplified detected data signal 712), and to generate an intrusion warning responsive to determining that a detected power loss is indicative of an intrusion. According to some examples, the receiver device 713 may be configured to generate an intrusion warning for power losses that exceed some minimum threshold, such as 1 dB, thereby avoiding false warnings.

At 814, a loss detector may optionally detect a power loss in the second optical signal. At 816, the loss detector may optionally generate an intrusion warning responsive to determining that the power loss detected at 814 is indicative of an intrusion in the HCF link. For example, the loss detector device 714 may be configured to monitor for power losses in the detected obfuscating signal 715, and to generate an intrusion warning responsive to determining that a detected power loss is indicative of an intrusion. According to some examples, the loss detector device 714 may be configured to generate an intrusion warning for power losses that exceed some minimum threshold, such as 1 dB, thereby avoiding false warnings.

Another mechanism by which HCF may be used to enhance security of optical communications is the high anticipated sensitivity of OTDR to HCF intrusions. Due to its hollow core, there is virtually no Rayleigh backscatter when OTDR is performed on HCF. For example, in "Hollow Core NANF with 0.28 dB/km Attenuation in the C and L Bands," *Optical Fiber Communication Conference,* 2020, Jasion et al. demonstrated undetectable backscatter (i.e., below the instrument noise floor) when performing OTDR on a particular NANF. This is in contrast to performing OTDR on conventional SC fiber, which exhibits relatively large background backscatter due to its solid core. As previously noted, the background backscatter in conventional SC fiber typically overwhelms reflections resulting from localized perturbations of the fiber, thereby limiting the ability to detect intrusions in SC fiber. In contrast, due to the negligible background backscatter in HCF, any OTDR reflections originating from an intrusion (such as a signal tapping attempt) are anticipated to be much more easily detectable than they would be in conventional SC fiber. The use of an OTDR device for detecting intrusions in HCF may also benefit from the very low CD and nonlinearity of HCF relative to conventional SC fiber. The ability to localize an intrusion in SC fiber using OTDR measurements is limited by CD and nonlinearities. For example, SC fiber may support OTDR pulses on the order of ~1 ns, which may provide a resolution on the order of ~20 cm for localizing an intrusion. In contrast, due to its low CD and nonlinearity, HCF may support ultra-short OTDR pulses on the order of ~10 ps at any wavelength within the transmission window of the HCF, and non-overlapping with data signals, which may be used to estimate the location of an intrusion to within ~0.3 cm.

Figure 9:
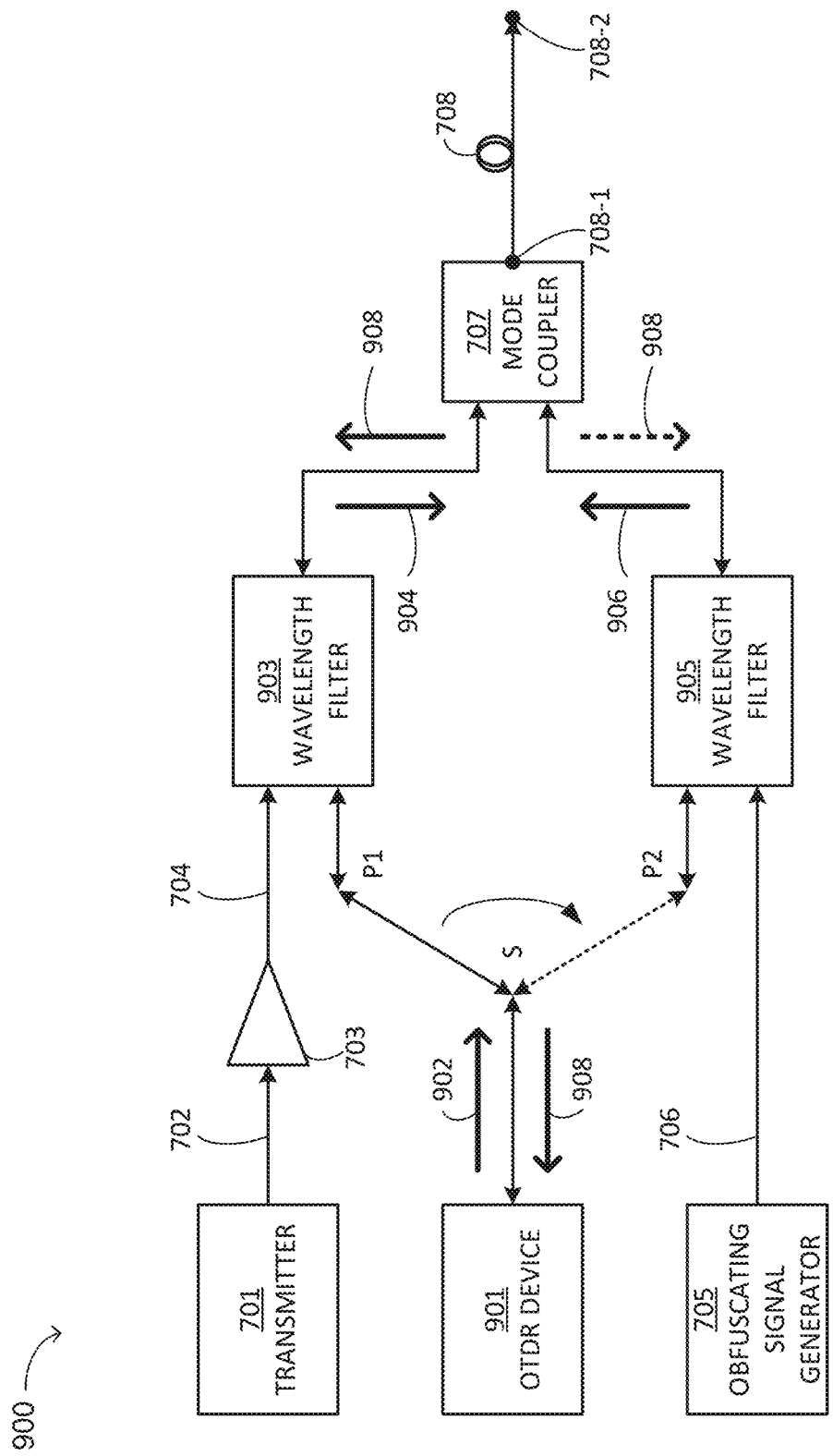
FIG. 9 illustrates an optical communication system configured for performing optical time-domain reflectometry (OTDR) on HCF in accordance with some examples of the technology disclosed herein.

According to some examples, OTDR functionality may be incorporated into the optical communication system 700 illustrated in FIG. 7. FIG. 9 illustrates an example optical communication system 900 configured for performing OTDR on HCF. Similarly to the system 700, the system 900 comprises the optical transmitter 701 configured to generate the data signal 702, which may be amplified by the optical amplifier 703, thereby resulting in the amplified data signal 704. The system 900 also comprises the obfuscating signal generator 705 configured to generate the obfuscating signal 706.

The system 900 further comprises an OTDR device 901, which may be configured to perform OTDR measurements on an optical fiber link. That is, the OTDR device 901 may be configured to generate a probe signal 902 comprising a series of optical probe pulses. According to some examples, the optical probe pulses may have a different wavelength than that of data signal 702 and the obfuscating signal 706. Commercial OTDR devices typically use a wavelength of 850 nm, 1300 nm, 1550 nm, or 1625 nm, with some units incorporating several sources and several detectors. When the optical probe pulses are injected into a proximal end of a fiber link, they may be reflected by discrete discontinuities (such as optical interfaces) and/or by distributed Rayleigh backscatter in the SC fiber. A reflections signal 908 comprising these reflections may be detected by the OTDR device 901 in a time-resolved manner, and measurements of the relative amplitudes and delays between the transmitted probe pulses and the detected reflections may provide information on relative losses and spatial position(s) of the reflections, thereby enabling a characterization of the fiber link. In some examples, the measurements performed at the OTDR device 901 may be used to determine the presence of an intrusion in the fiber link. For example, the OTDR device 901 may be configured to compare the reflections signal 908 to a predetermined baseline reflection signature for the particular fiber link being probed, where the baseline reflection signature was obtained in the absence of any intrusion of the fiber link. In the event that the reflections signal 908 is sufficiently different from the baseline reflection signature (for example, the difference exceeds some threshold), the OTDR device 901 may generate an intrusion warning to prompt an administrator to take additional measures to protect the security of optical communications on the HCF link.

In accordance with some examples of the proposed technology, the system 900 may be configured to transmit the probe signal 902 on the fundamental mode of the HCF link 708 or alternatively on at least one higher-order mode of the HCF link 708. For example, the OTDR device 901 may be bidirectionally coupled to a switch S. When the switch S is in a position P1, the probe signal 902 is conveyed to a wavelength filter 903, which may be configured to multiplex the probe signal 902 and the amplified data signal 704. In this configuration, the wavelength filter 903 may output an optical signal 904 which substantially corresponds to a combination of the probe signal 902 and the data signal 704. When the switch S is in a position P2, the probe signal 902 is conveyed to another wavelength filter 905, which may be configured to multiplex the probe signal 902 and the obfuscating signal 706. In this configuration, the wavelength filter 905 may output an optical signal 906 which substantially corresponds to a combination of the probe signal 902 and the obfuscating signal 706.

The optical signals 904 and 906 may be input, in parallel, to the propagation mode coupler 707 which is connected to the proximal end of the HCF link 708. The mode coupler 707 is configured to condition the signal 904 such that it is injected into the fundamental mode of the HCF link 708. The mode coupler 707 is also configured to condition the signal 906 such that it is injected into at least one higher-order mode of the HCF link 708. Thus, when the switch S is in the position P1, the probe signal 902 is conveyed (via the signal 904) on the fundamental mode, and when the switch S is in the position P2, the probe signal 902 is conveyed (via the signal 906) on the at least one higher-order mode.

The HCF link 708 propagates the probe signal 902, either in the fundamental mode or the at least one higher-order mode, from the proximal end 708-1 towards the distal end 708-2. An intrusion at any point on the HCF link 708 may cause reflections of the probe pulses contained in the probe signal 902. The reflections signal 908 comprising these reflections originating from the HCF link 708 may be transmitted via the mode coupler 707 (which is a reciprocal passive optical device) to either the wavelength filter 903 or the wavelength filter 905 and back to the OTDR device 901 via the switch S. For example, where the switch S is in position P1 such that the probe signal 902 is injected into the fundamental mode of the HCF link 708, the mode coupler 707 may convey the reflections signal 908 back through the wavelength filter 903 and the switch S at position P1 for detection by the OTDR device 901. Alternatively, where the switch S is in position P2 such that the probe signal 902 is injected into the at least one higher-order mode of the HCF link 708, the mode coupler 707 may convey the reflections signal 908 back through the wavelength filter 905 and the switch S at position P2 for detection by the OTDR device 901.

For the configuration where the probe signal 902 is coupled into at least one higher-order mode via the wavelength filter 905, the HCF link 708 may be characterized by structural properties selected to optimize propagation loss in the at least one higher-order mode. That is, the structural properties of the HCF link 708 may be designed to sustain propagation on the at least one higher-order mode, such that the probe signal 902 propagates along the entire length of the HCF link 708.

The use of the switch S for selecting the propagation mode on which to convey the probe signal 902 is merely one possibility. Other examples are contemplated. For example, the system may be hardwired to convey the probe signal 902 exclusively on the fundamental mode, or exclusively on the at least one higher-order mode. It is also contemplated that the probe signal 902 may be simultaneously coupled into both the fundamental mode and the at least one higher-order mode. In this case, the reflections in the different modes may be detected separately, with the OTDR device 901 having two separate fiber outputs and two separate back-reflection detectors for the reflections originating from the different modes.

Advantageously, under normal conditions, the HCF link 708 is expected to exhibit almost zero Rayleigh backscatter in both the fundamental and higher-order modes. The virtual absence of background backscatter is expected to increase the sensitivity of the OTDR device 901 to OTDR reflections caused by physical perturbations of the HCF link 708, such as intrusions. Additionally, where the OTDR pulses are conveyed on at least one higher-order mode surrounding the fundamental mode, an intrusion may result in earlier detection of OTDR reflections than would be the case for OTDR pulses conveyed on the fundamental mode. This is because a physical perturbation of the HCF link 708 is expected to disrupt the higher-order modes before affected the fundamental mode. Accordingly, the use of OTDR in at least one higher-order mode of the HCF link 708 may provide an early warning of an intrusion.

It is also advantageous that the HCF link 708 is expected to exhibit low CD and nonlinearity. Shorter probe pulses may enable OTDR measurements with a higher spatial resolution. However, shorter probe pulses are also more limited in power, thereby resulting in OTDR measurements with higher noise. The low CD and nonlinearity of HCF may enable the use of ultra-short probe pulses, which may in turn result in reflections whose origins may be localized to a very high resolution. For example, the OTDR device 901 may be configured to generate probe pulses of duration 1 ns or lower, and to use detected OTDR reflections to determine a position of an intrusion to within a resolution of 30 cm or lower. According to some examples, the OTDR device 901 may be configured to generate OTDR pulses of duration 10 ps or lower, and to use detected OTDR reflections to determine a position of an intrusion to within a resolution of 0.3 cm or lower.

Although not explicitly illustrated in FIG. 9, the OTDR device 901 may comprise a computer-readable medium storing computer-executable instructions which, when executed by a processor of the OTDR device 901, cause the OTDR device 901 to perform the various actions described above, such as generating and transmitting the probe pulses, detecting and processing the reflections, and performing measurements on the reflections so as to characterize the link and/or determine the presence of an intrusion and/or generate an intrusion warning.

Figure 10:
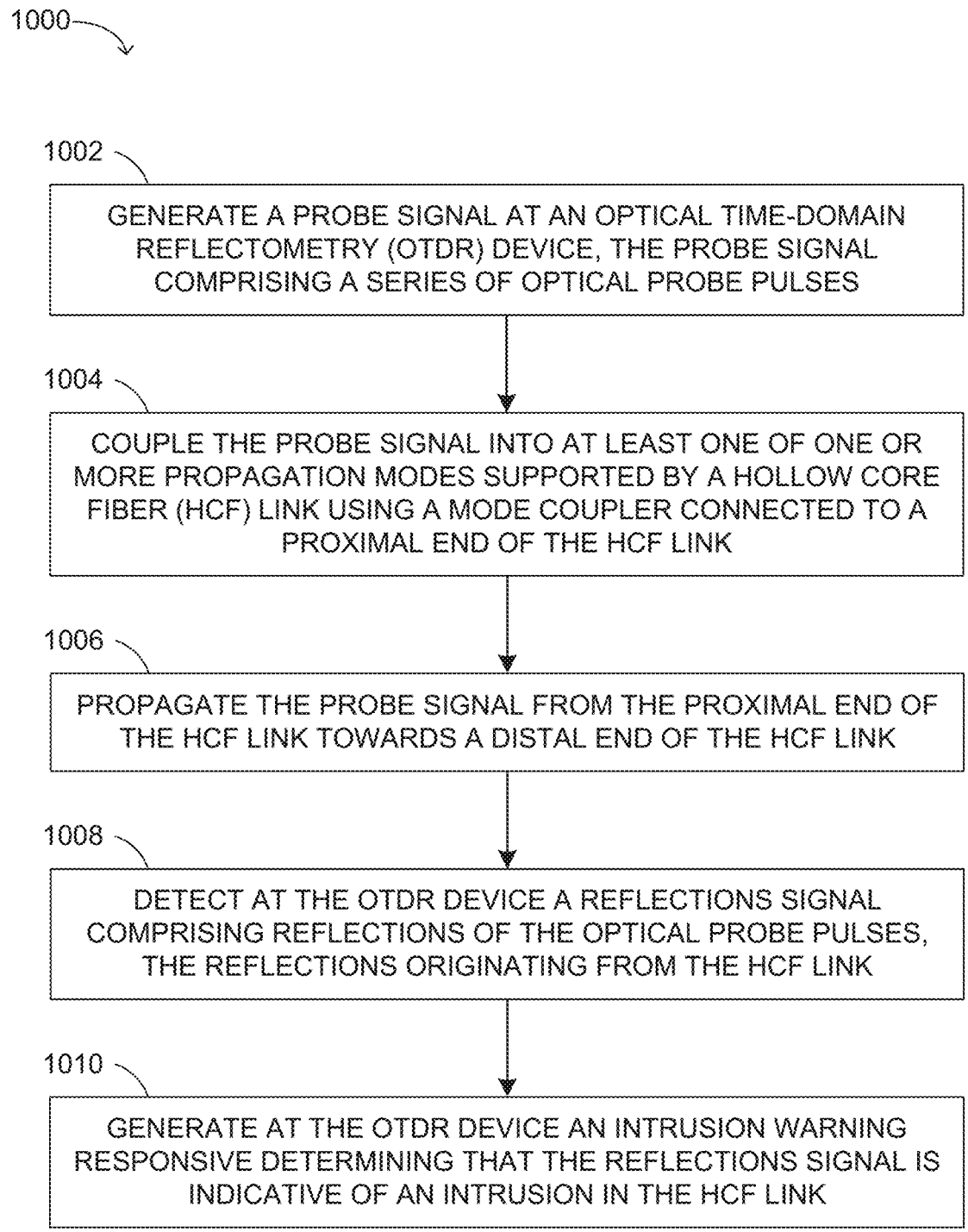
FIG. 10 illustrates a method for performing OTDR on HCF in accordance with some examples of the technology disclosed herein.

FIG. 10 illustrates an example method 1000 for performing OTDR on HCF. According to some examples, the method 1000 may be performed in the optical communication system 900.

At 1002, an OTDR device generates a probe signal comprising a series of optical pulses. For example, the OTDR device 901 may generate the probe signal 902.

At 1004, a propagation mode coupler connected to a proximal end of a HCF link supporting light propagation in one or more propagation modes is used to couple the probe signal into at least one of the propagation modes. For example, the mode coupler 707 connected to the proximal end 708-1 of the HCF link 708 may be used to couple the probe signal 902 into either the fundamental mode or at least one higher-order mode of the HCF link 708, depending on whether the switch S is in position P1 or position P2.

At 1006, the probe signal is propagated from the proximal end of the HCF link towards a distal end of the HCF link. For example, the signals 904 and 906 may be propagated, respectively, on the fundamental mode and on the at least one higher-order mode of the HCF link 708 from the proximal end 708-1 towards the distal end 708-2, with the probe signal 902 being conveyed either via the signal 904 or the signal 906, depending on the position of the switch S.

At 1008, the OTDR device detects a reflection signal comprising reflections of the optical pulses originating from the HCF link. For example, the OTDR device 901 may detect the reflection signal 908, which is received either via the fundamental mode or the least one higher-order mode, depending on the mode on which the probe signal 902 was conveyed.

At 1010, the OTDR device generates an intrusion warning responsive to determining that the reflections signal is indicative of an intrusion in the HCF link. For example, the OTDR device 901 may determine that the reflections signal 908 is sufficiently different from a predetermined baseline reflection signature (for example, the difference is greater than some threshold) to warrant generating an intrusion warning. According to some examples, an intrusion warning may indicate a position of an intrusion. For example, for probe pulses of duration 1 ns or lower, the indicated position of the intrusion may have a resolution of 30 cm or lower. According to some examples, an intrusion warning may prompt an administrator to take additional measures to protect the security of optical communications on the HCF link.

The scope of the claims should not be limited by the details set forth in the examples, but should be given the broadest interpretation consistent with the description as a whole.

What is claimed is:

1. An optical communication system comprising:
   a hollow core fiber (HCF) link supporting light propagation in a fundamental mode and in at least one higher-order mode, wherein the HCF link is characterized by structural properties selected to sustain the light propagation on both the fundamental mode and the at least one higher-order mode;
   a propagation mode coupler connected to a proximal end of the HCF link, wherein the propagation mode coupler is configured to couple a data signal into the fundamental mode and to couple an obfuscating signal into the at least one higher-order mode for simultaneous propagation of the data signal and the obfuscating signal on the HCF link, and wherein the obfuscating signal substantially overlaps the data signal in spectral content; and
   a propagation mode splitter connected to a distal end of the HCF link, wherein the propagation mode splitter is configured to split a first optical signal detected in the fundamental mode from a second optical signal detected in the at least one higher-order mode.

2. The optical communication system as claimed in claim 1, wherein the obfuscating signal comprises a noise signal.

3. The optical communication system as claimed in claim 1, wherein the HCF link comprises hollow core anti-resonant fiber (HC-ARF).

4. The optical communication system as claimed in claim 3, wherein the HC-ARF comprises nested anti-resonant nodeless fiber (NANF).

5. The optical communication system as claimed in claim 1, further comprising
   an optical receiver device configured to recover the data signal from the first optical signal.

6. The optical communication system as claimed in claim 5, wherein the optical receiver device is further configured
   to detect a power loss in the first optical signal; and
   to generate an intrusion warning responsive to determining that the power loss is indicative of an intrusion in the HCF link.

7. The optical communication system as claimed in claim 1, further comprising
   a loss detector device configured
      to detect a power loss in the second optical signal; and
      to generate an intrusion warning responsive to determining that the power loss is indicative of an intrusion in the HCF link.

8. The optical communication system as claimed in claim 1, wherein the at least one higher-order mode substantially physically surrounds the fundamental mode.

9. A method comprising:
   generating a probe signal at an optical time-domain reflectometry (OTDR) device, the probe signal comprising a series of optical probe pulses;
   coupling the probe signal into at least one of one or more propagation modes supported by a hollow core fiber (HCF) link comprising HCF using a propagation mode coupler connected to a proximal end of the HCF link;
   propagating the probe signal from the proximal end of the HCF link towards a distal end of the HCF link;
   detecting at the OTDR device a reflections signal comprising reflections of the optical probe pulses, the reflections originating from the HCF in the HCF link; and
   generating at the OTDR device an intrusion warning responsive to determining that the reflections signal is indicative of an intrusion in the HCF link.

10. The method as claimed in claim 9, wherein the HCF link supports light propagation in a fundamental mode and at least one higher-order mode, wherein the HCF link is characterized by structural properties selected to sustain the light propagation on the at least one higher-order mode, and wherein the propagation mode coupler is configured to couple the probe signal into the at least one higher-order mode.

11. The method as claimed in claim 9, wherein the optical probe pulses are each of duration 1 ns or lower, and wherein the intrusion warning indicates a position of the intrusion with a resolution of 30 cm or lower.

12. The method as claimed in claim 11, wherein the optical probe pulses are each of duration 10 ps or lower, and wherein the intrusion warning indicates a position of the intrusion with a resolution of 0.3 cm or lower.

13. A method comprising:
   using a propagation mode coupler connected to a proximal end of a hollow core fiber (HCF) link,
      coupling a data signal into a fundamental mode supported by the HCF link, and
      coupling an obfuscating signal into at least one higher-order mode supported by the HCF link, wherein the obfuscating signal substantially overlaps the data signal in spectral content;
   simultaneously propagating the data signal and the obfuscating signal from the proximal end of the HCF link to a distal end of the HCF link, wherein the HCF link is characterized by structural properties selected to sustain the light propagation on both the fundamental mode and the at least one higher-order mode; and
   using a propagation mode splitter connected to a distal end of the HCF link, splitting a first optical signal detected in the fundamental mode from a second optical signal detected in the at least one higher-order mode.

14. The method as claimed in claim 13, wherein the obfuscating signal comprises a noise signal.

15. The method as claimed in claim 13, wherein the HCF link comprises hollow core anti-resonant fiber (HC-ARF).

16. The method as claimed in claim 15, wherein the HC-ARF comprises nested anti-resonant nodeless fiber (NANF).

17. The method as claimed in claim 13, further comprising
   at a receiver device, recovering the data signal from the first optical signal.

18. The method as claimed in claim 17, further comprising
   at the receiver device, detecting a power loss in the first optical signal, and generating an intrusion warning responsive to determining that the power loss is indicative of an intrusion in the HCF link.

19. The method as claimed in claim 13, further comprising
   at a loss detector device, detecting a power in the second optical signal, and generating an intrusion warning responsive to determining that the power loss is indicative of an intrusion in the HCF link.

20. The method as claimed in claim 13, wherein the at least one higher-order mode substantially physically surrounds the fundamental mode.

\* \* \* \* \*